(12) United States Patent
McLemore et al.

(10) Patent No.: US 7,426,885 B2
(45) Date of Patent: Sep. 23, 2008

(54) COOKING DEVICE

(76) Inventors: Don McLemore, 450 Brown Ave., Columbus, GA (US) 31906; John D. McLemore, 105 Hickory Ct., Fortson, GA (US) 31906

( * ) Notice: Subject to any disclaimer, the term of this patent is extended or adjusted under 35 U.S.C. 154(b) by 562 days.

(21) Appl. No.: 11/020,027

(22) Filed: Dec. 23, 2004

(65) Prior Publication Data
US 2006/0137543 A1 Jun. 29, 2006

(51) Int. Cl.
*A23L 1/01* (2006.01)
(52) U.S. Cl. .................... 99/482; 99/467; 126/59.5
(58) Field of Classification Search ............. 99/482, 99/481, 467, 473; 126/59.5, 283
See application file for complete search history.

(56) References Cited

U.S. PATENT DOCUMENTS

| | | | |
|---|---|---|---|
| 652,531 A * | 6/1900 | Carlson | 99/482 |
| 1,444,647 A * | 2/1923 | Trout et al. | 126/59.5 |
| 3,776,127 A | 12/1973 | Muse | |
| 4,020,322 A | 4/1977 | Muse | |
| 4,309,938 A | 1/1982 | Harmon | |
| 4,321,857 A | 3/1982 | Best | |
| 4,325,294 A | 4/1982 | Hammond | |
| 4,377,733 A | 3/1983 | Yamaguchi et al. | 219/10.55 B |
| 4,471,748 A | 9/1984 | Venable | |
| 4,475,024 A | 10/1984 | Tateda | 219/10.55 B |
| 4,509,868 A | 4/1985 | Ronconi et al. | 374/141 |
| 4,626,662 A | 12/1986 | Woolf | 219/501 |
| 4,697,506 A | 10/1987 | Ducate, Jr. | |

(Continued)

FOREIGN PATENT DOCUMENTS

DE 3437398 4/1986

JP 62-062130 3/1987

OTHER PUBLICATIONS

"Smokers & Accessories Galore!", pulled from internet at http://www.ocbarbecues.comsmokers.asp on Jun. 25, 2004 (3 pages).

(Continued)

*Primary Examiner*—Reginald L Alexander
(74) *Attorney, Agent, or Firm*—Smith, Gambrell & Russell LLP

(57) ABSTRACT

A smoker having a smoke generating material loader which preferably is insertable and retractable through a housing aperture and is adjustable between a no dump state and a dump state once inserted, preferably relative to a receiver tray that is closer to a heat source, as in an electric heat resistance bar, to cause smoke generation of smoke generating material received from the loader when placed in a dump state. The loader preferably has one or more seal off end caps or sections relative to the receiving housing aperture to provide a heat retention function. A preferred embodiment features a nested arrangement between the inserted loader and receiver tray and preferably the receiver tray is in a sliding supported relationship with the loader as in a semi-cylindrical loader main body in contact with one or more concave supporting surfaces of the receiver tray. The receiver tray also preferably has opposing shielding walls extending up from opposite sides of an apertured base receiving tray. The opposing shields also preferably having an upper constricted opening in close proximity to a rotating loader main body and at a common height with the constricting opening brought about by the nesting arrangement.

8 Claims, 17 Drawing Sheets

U.S. PATENT DOCUMENTS

| | | | |
|---|---|---|---|
| 4,716,411 A | 12/1987 | Nakamura | 340/870.17 |
| 4,770,157 A | 9/1988 | Shepherd et al. | |
| 5,070,776 A | 12/1991 | Schlosser et al. | |
| 5,138,939 A | 8/1992 | Bradley et al. | |
| 5,167,183 A | 12/1992 | Schlosser et al. | |
| 5,713,267 A | 2/1998 | Wilson | |
| 5,718,165 A | 2/1998 | Winstead | 99/400 |
| 5,891,498 A | 4/1999 | Boehler | |
| 5,947,007 A | 9/1999 | O'Grady et al. | |
| 6,035,770 A * | 3/2000 | Whitefield | 99/482 |
| 6,095,132 A | 8/2000 | Ganard et al. | |
| 6,102,028 A | 8/2000 | Schlosser et al. | |
| 6,209,533 B1 | 4/2001 | Ganard | |
| 6,481,344 B1 | 11/2002 | Green et al. | |
| 6,501,384 B2 | 12/2002 | Chapman et al. | 340/584 |
| 6,539,842 B1 | 4/2003 | Chapman et al. | 99/342 |
| 6,568,848 B1 | 5/2003 | Chapman et al. | 374/155 |
| 6,595,197 B1 | 7/2003 | Ganard | |
| 6,701,829 B2 | 3/2004 | Farrow | |
| 6,730,890 B2 * | 5/2004 | Kish et al. | 219/506 |
| 6,811,308 B2 | 11/2004 | Chapman et al. | 374/155 |
| 7,157,668 B2 * | 1/2007 | Bartelick | 219/393 |

OTHER PUBLICATIONS

"Barbecue Grill Store", pulled from internet at http://www.americasbestbbq.com/smokers_grillstore.htm on Jun. 25, 2004 (1 page).

"How Grills Work", pulled from internet at http://home.howstuffworks.com/grill.htn/printable on Aug. 12, 2004 (9 pages).

"Cabela's Christmas 2004", World's Foremost Outfitter, (6 pages), date unknown.

* cited by examiner

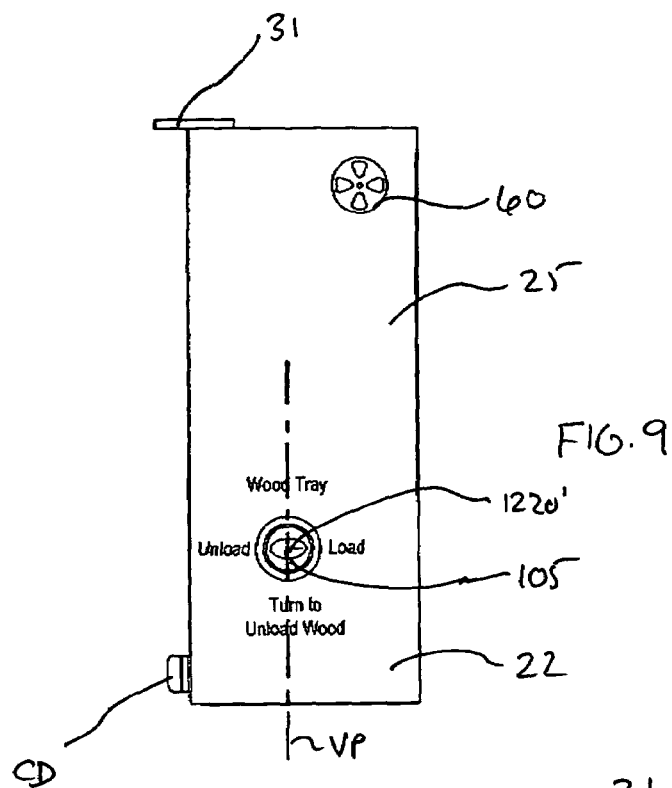
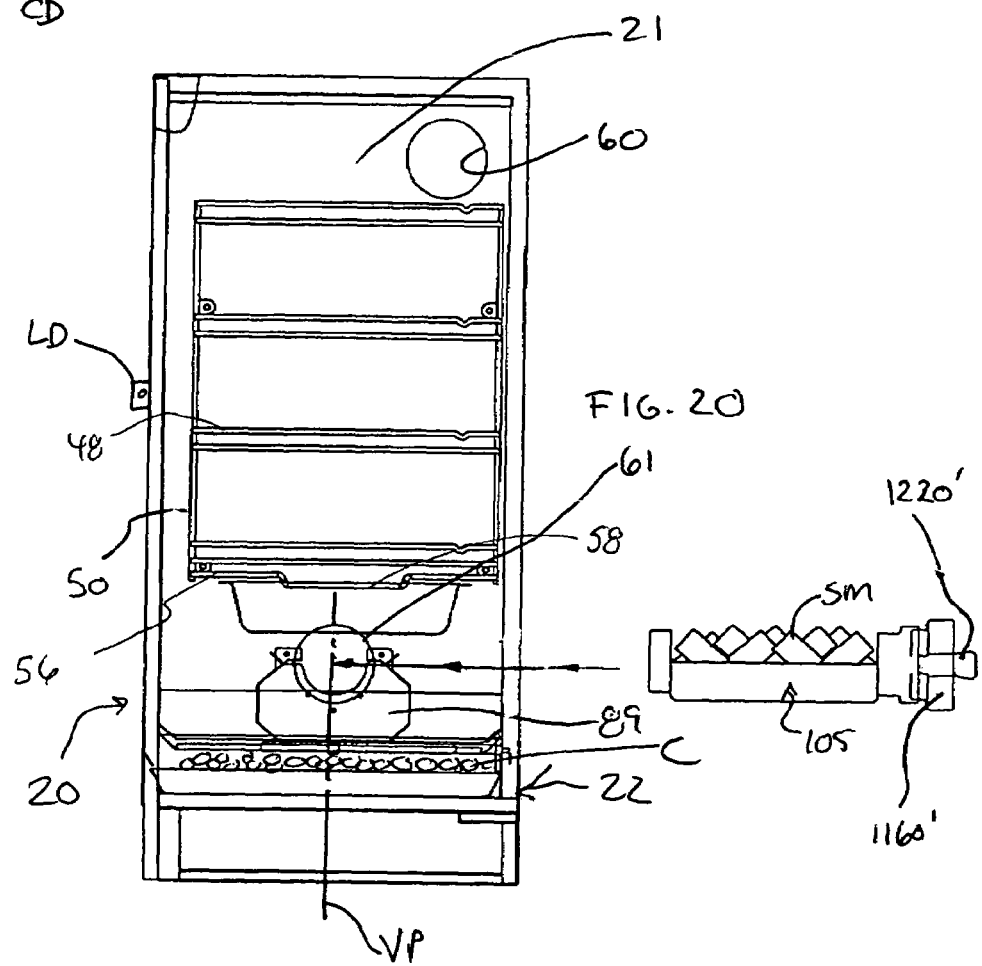

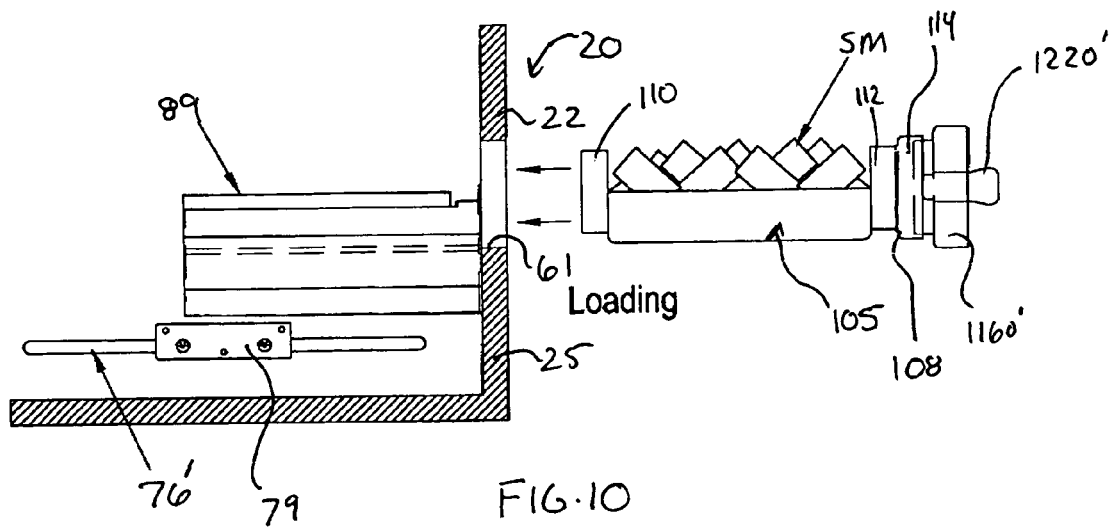
FIG. 10
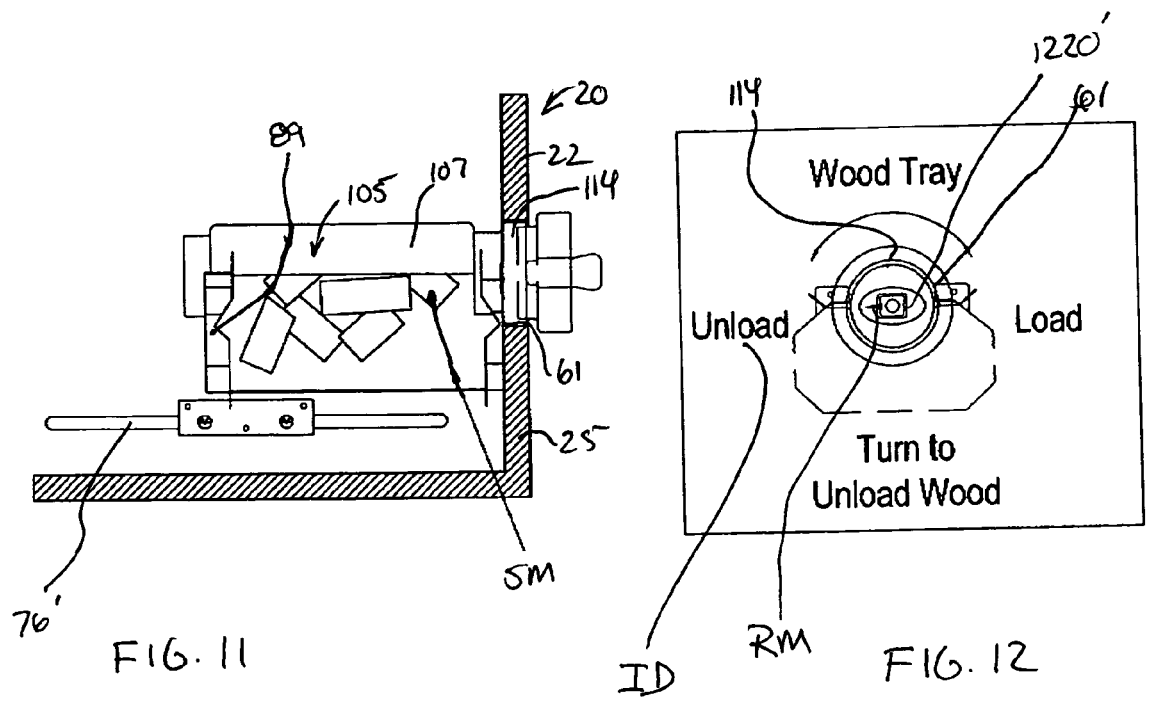
FIG. 11
FIG. 12

COOKING DEVICE

FIELD OF THE INVENTION

The present invention comprises a cooking device with a release feeder device as in a smoker apparatus with a smoke generating material loader that is preferably manipulated (e.g., dialed) between a storage mode and a release mode, wherein a supply of wood chips or some other smoke generating material is released to a receiving area of the cooking apparatus as in a receiver tray and subjected to a heat source.

BACKGROUND OF THE INVENTION

Both indoor and outdoor grilling has continued to increase in popularity and, in the United States alone, it is estimated that 75% of US households have an outdoor cooking grill, which percentage further increases when indoor grilling is also taken into consideration. This increased popularity with grilling has led to more sophisticated cookers who are no longer satisfied with merely cooking over a bed of charcoal, but have moved into alternate food preparation techniques as in smoking food to prepare a delicious, succulent entrée.

Various conventional cookers of the smoker type exists and are typically of the outdoor type. The heat sources for cookers are based on various fuels as in gas, electric sources (e.g., electric resistance bars or infrared ceramic plates), charcoal, etc. An advantage of a smoker cooker is that a desirable smoked flavor is imparted to the food and the cooking technique is generally carried out at low to moderate heat levels. The smoking cooking techniques can also promote basting of the food as the juices from the food are caught and vaporized to baste the food to keep the food moist and prevent dehydration while the smoke flavor is imparted to the food. In addition, with the inclusion of a drip pan the juices can be captured and this drip pan can also hold fluids such as water which, in conjunction with the heat source, provide additional moisture in the food being smoked (e.g., meats, fish, etc.).

A typical conventional smoker assembly includes a housing containing one or more grill racks, the above noted pan positioned below the grill for dripping collection and vapor generation, a heat source, and a wood chip tray or rack, placed adjacent the heat source, to hold the smoke producing material (e.g., to generate the smoke there is typically used materials such as hickory, alder and mesquite wood in any one of a variety of forms as in chips, briquettes, and saw dust).

In addition, the prior art devices include stand alone smokers as seen, for example, in U.S. Pat. Nos. 5,713,267; 4,417,748; 4,309,938; 4,020,322 and 3,776,127 as well as those that are designed as an added feature to a grill assembly as seen by U.S. Pat. Nos. 5,891,498; 5,718,165; 5,167,183 and 4,770,157. Additionally, the prior art discloses a variety of structures for generating the smoke and providing the smoke to the food, including a generally common housing embodiment with both an internalized firebox (where the material is subjected to heat and initiates smoke generation) and a smoke/food contact chamber or smoker location (where the smoke is applied to the food) as seen from U.S. Pat. No. 4,321,857; those with an exterior fire box with direct attachment to a smoker housing as exemplified by U.S. Pat. No. 6,209,533; as well as those that are externally connected to the smoking location via a smoke conduit or the like as seen from U.S. Pat. No. 5,138,939.

The above noted references additionally illustrate ways of supplying the smoke generating material, with U.S. Pat. No. 5,138,939 featuring a supply stack of pellets which are fed via a motorized pusher assembly to the smoke generation location, U.S. Pat. No. 3,776,127 illustrating an upper domed cover which provides access to the interior of the smoker when cool, U.S. Pat. Nos. 5,891,498 and 4,309,938 showing a door access arrangement and U.S. Pat. Nos. 4,770,157 and 5,718,165 illustrating sliding insertion drawers.

Problems associated with the prior art includes difficulty in accessing the tray or smoke generating material support once cooking is initiated and the heat level rises to near or at the cooking temperature, the inability to easily re-supply the smoke generating source material without seriously disrupting an ongoing smoking process (e.g., an excessive release of built up smoke and/or heat), and/or a removal from the firebox housing of at least some of the currently utilized smoke generating material (which can also lead to ash material falling out on the cook and/or exterior environment), and/or the reliance on a highly complex supply assembly as exemplified by U.S. Pat. No. 5,138,939. In addition, due to the lower heat, longer time often associated with smoking food, when the fuel source is of the replenishment type (e.g., charcoal or wood fuel), the fuel itself often needs to be replenished during the course of a single food smoking operation. This need to resupply also leads to heat release from the firebox housing and the potential for release of smoke, ashes, etc.

SUMMARY OF THE INVENTION

The present invention is directed at providing a cooking apparatus such as a smoker cooking apparatus with a smoke generating material supply and/or resupply device as in a release feeder device that is directed at alleviating or reducing the above noted deficiencies in the prior art by providing an easy to operate, not unduly complex smoke generating material feeder or loader that, among other things, preferably allows for a resupply in an on-going smoking process without serious disruption of that smoking process and also provides an easy way to initially supply and/or resupply later the smoke generating material while the cooking apparatus has heated up (as in the desired smoker cook temperature level) with a lower chance of operator or environment burning.

The loader can be relied upon as the sole source of feeding the receiving area of the smoke generating material or, more preferably, as a secondary source of supply as in its use in combination with an alternate initial supply assembly (e.g., a pivot or slide door access/a removable top or side cover/a sliding drawer, etc. which can be used during an initial preheat up stage). Also, the loader of the present invention is preferably gravity assisted with a rotating arrangement preferred as in one where the loader is positioned above a wood chip receiver tray that is closer to the heat source as compared to the loader which is farther removed from the heat source. To facilitate the rotation unloading, the loader is preferably in the form of a container having a bottom and side wall configuration with smoker material load recess, as in a container that is semi-cylindrical in shape and insertable through an opening into a reception state with a rotation support structure providing one or more bearing contact surfaces that provide bearing contact as the container is adjusted (e.g., rotated) from a smoker material storage state (opening facing the top of the smoker or away from the heat source) to an unloading state, as in one which is 180° removed from the storage state wherein the load is transferred, preferably by way of a gravity assisted fall, into a recipient device such as a smoke generating material "firebox" receiver tray below.

The cook thus has greater flexibility in the smoking process in that, upon an apparent depletion of smoke generation material, a resupply can be carried out either by a pre-loaded and earlier inserted resupply loader (while cool or prior to reaching the desired smoker temperature) or one that is removed during the smoking process and loaded with the desired amount of resupply smoke generating material reinserted and then dumped. The timing of resupply can be based on factors such as experience, direct observation (e.g., a transparent viewing window in the housing or a preexisting gas access port), sensed parameters (smoke density detector) or on a pre-established schedule (e.g. a time and release with an automated loader with timer). Enhanced flexibility is also found in the ability to resupply with an alternate "flavor" smoke material as in starting with hickory and switching to an alternate or supplemental smoking flavor closer to completion time of an ongoing food item or relative to a switched out cooked food item (e.g., through an access door) and having either a similar smoke generating material or a different "flavor" smoke generating material in the loader ready for supplying the firebox tray without having to remove the higher temperature resupply loader at any point during the smoking process, or if the loader is removed and reloaded with smoke generating material it is done so with minimal disruption to the smoking process. While a fixed in position food support during the smoking process (e.g., slide in food support racks) is preferred under the present invention in line with the desire for avoiding complexity, the present invention also features alternate food support means such as a mechanized moving food support that is internalized (e.g., an internal housing set of food securement means such as skewers which rotate during the smoking process either individually or in an interconnected (e.g., chain link)) fashion or an internal to external mechanized moving food support means as in a timed conveyor system passing in and out of the smoker housing with appropriate smoke sealing ports.

An additional feature of an embodiment of the present invention is a loader provided with a solid bottom and a receiving area or firebox receiver tray provided with a perforated base to facilitate heat contact and ash release. The removal of the loader is thus made a much cleaner and safer process in that there is avoided ash dissipation during the removal of the loader from the confines of the housing, which in prior art systems can require the removal of still smoldering ash with associated hazards.

A preferred embodiment of the present invention includes a smoker such as a stand alone structure (e.g., a box like self supporting structure) or a structure suited for attachment to a grill structure (e.g., a box like structure that has means for engagement with a preexisting grill structure or is otherwise integrated with the grill). The smoker housing preferably has rectangular side walls having sides more elongated in the vertical direction than widthwise and depth wise as to accommodate a multitude of slidable food support racks (e.g., 2 to 6 racks as in 4 racks spaced at different vertical heights from the base of the smoker). One of the side walls preferably comprises a door as in one that extends for more than a majority of the height of the smoker and is hinged at a border edge between two walls of the housing (e.g., the door itself and a side wall) so as to provide ready access to the food racks as well as the preferably included drip pan and/or liquid vapor generating liquid (e.g., water) container that is/are provided between the heat source and food rack(s) as well as an apertured firebox receiver tray in contact with or closely adjacent the heat source (e.g., in direct (above/below) contact or with small spacing as in less than two inches and more preferably less than an inch). The heat source is preferably a coiled electric heat resistance bar (and thus can be an indoor device, but in view of the smoke generation and associated typical indoor ducting requirements, outdoor usage is a more typical usage of the subject matter of the present invention).

The loader preferably extends through an opening formed in one of the walls of the housing at a vertical height (e.g., mid level) above the firebox tray and preferably is also aligned along a vertical plane extending through each of the loader and firebox tray (although an offset arrangement is also featured under the subject matter of the invention as in one having a reload slide shoot to compensate for any vertical non-alignment between the loader and the firebox receiver tray receiving the smoker material for initiation of smoke generation). However, the directly above arrangement is favored in that it provides a less complex structure. Also, the loader's peripheral profile is preferably made smaller than the receiver tray (e.g., a smaller length and/or width relative to the receiver tray) as to better accomplish a no-spillage interchange during the unloading of the smoke generating material. In this regard, the loader is provided a short distance above the receiving opening in the receiver tray as in an arrangement wherein the loader is placed vertically between the receiver tray below and the drip pan and food rack above. A centrally located (relative to sidewall depth) opening is well suited for good smoke dissipation and the loader extends inward into the housing, as in inward to a central location relative to a horizontal cross-section of the housing, with the loader's central axis of elongation (which coincides with the axis of rotation in the preferred rotatable loader assembly) being arranged 90° offset from an axis extending in a front to back direction though a central region of the door to achieve the preferred side loading arrangement or an arrangement wherein the loader is in a non-door wall portion of the smoker housing. The loader is preferably partially nested relative to the receiver tray in the sense that a portion of the vertical height of the loader tray overlaps with a portion of the receiver tray, as in upper side wall edges of the tray extending vertically up and to opposite sides of the loader at least to some extent (e.g., a semi-cylindrical loader which vertically overlaps or nests within the firebox receiver tray below both when in the pre-dump and the dump position). Further, the loader preferably provides some degree of covering enclosure functioning relative to the open upper end of the smoke generating material receiver tray. Also, the free edge (innermost within housing) of the receiver tray preferably vertically overlaps with a closing end cap of the nested loader.

In a preferred embodiment, the smoker includes a double wall arrangement, and preferably is in the form of an insulated housing having a generally mini-bar refrigerator configuration and a door provided over, for example, a majority or more of one side wall such as a hinged door with a sealing strip to seal off the doorway. The sealing strip is formed of a material suitable for handling in excess of the temperature range-involved with standard smoker techniques (e.g., 150° F. to 350° F.). The smoke generated from the smoke generating material can thus be sealed in and maintained in contact with the food product being smoked at a higher efficiency which is beneficial for the preferred smoke processing times of six (6) to twelve (12) hours.

Also, the housing of the smoker is preferably provided with a base having a false-bottom configuration with a vertically downward extending flange peripheral side wall (as in one that is separate or part of the main body smoker housing structure) and a bottom (again can be separate or part of the main smoker housing) and is closed off at the top edge of the peripheral flange with a plate so as to provide an insulating opening below the false bottom plate that also preferably functions as a location for providing control equipment for the heat source as in an electric control circuit for an electric heater and a gas flow control system for a gas burner and/or temperature sensing means and timing devices, etc. In this regard, a heat source control device as in a dial or touch pad is preferably provided on the external surface of the smoker housing for user manipulation (e.g., at the base as in the vertical flange or, more preferably, at a higher location on the housing with temperature and/or time adjustment communication means (hardwired or wireless transceiver/receiver signal arrangement associated with the heat source control)).

Also, the temperature control and/or timer is preferably a digital system, and is positioned at the bottom of the refrigerator in one embodiment and internalized within the double walled main housing section (e.g., within a door hollow) in another embodiment, although other positions (separate housing externally attached) are also featured. There is further preferably provided a remote (e.g., wired or wireless connection) between a hand operated control transmitter and a housing supported control unit with receiver unit for remote adjustment of smoker apparatus characteristics as in the above noted temperature and time. For example a 30 feet or less (e.g. a 20 foot or less as in a Bluetooth™ wireless connection) with press button adjustment signal generators is provided for altering the temperature setting for smoke processing of the food and/or for altering a timer or the like for smoking time and/or another smoker apparatus characteristic as in overall on/off of the smoker, position adjustment of, for example, food support means and/or the loader, etc. Thus a person sitting at a patio table can adjust the cooking apparatus settings at a remote deck location without having to move from the present location. A feedback transmitter/receiver arrangement is further preferably provided in an alternate embodiment for supplying data to a display means on the remote, as in for example, present temperature status data output or time left or incurred (based on an internal heat sensor and timer), preferably associated with a calculated temperature or time difference relative to a preset temperature or time value, loader position status information (full, in pre-dump position, in dump position, etc.), as well as possible other characteristics, such as door lock status, vent operative opening and air access opening sizing (when venting is involved as an alternate embodiment of the invention further includes a no air entry embodiment operating, for example, at a low temperature setting range of 100° to 250°). An alternate embodiment of the invention comprises an automated loader assembly such as one having means for implementing an automated unloading of the loader (e.g., loader adjustment turning means) as in gear and chain, electrical solenoid hydraulic manipulation, etc. to manipulate the loader for achieving, for example, a pre-dump to dump and return to pre-dump sequence, although a manual device is preferred for less complexity reasons. An additional embodiment includes means for automated withdrawal of the loader external to housing and re-insertion fully internal in the housing (e.g., a gear rack with motor for sliding in and out of the loader). The automated loader dumping and/or loader insertion/retracting means of the present invention are also preferably associated with the above noted remote control (e.g., added functions to the temperature and time altering control described above). Again, for simplicity and cost production, however, a hand operated loader retraction and insertion and dump and return to pre-dump arrangement are preferred.

Further, just above the base plate or floor at the lower region of the smoker housing there is preferably provided an ash tray that can be readily removed upon opening the door (or some alternate access means as in a sliding drawer ash tray slot arrangement) once the smoker has sufficiently cooled. With a preferred electrical heater bar embodiment, the ash tray is positioned below a heat source such as a heat resistance bar and below the apertured receiver tray's bottom plate.

A preferred loader support structure features a reception aperture provided in the housing wall which is generally configured commensurate with the shape of the end of the loader that is positioned closest to that wall following full insertion of the loader into the housing. For example, with the preferred semi-cylindrical loader configuration, a circular aperture is provided in a side wall of the housing which is dimensioned to be generally of the same size as the circumference associated with the support end of the loader as in a slight friction contact arrangement or a slight gap (e.g., less than ⅛ inch with or without sealing means) to preclude excessive heat and smoke release while still providing for loader dump rotation. The support end of the loader is thus preferably a circular disk as the end of the partially open cylindrical dumper body that preferably has some axial thickness about its sealing periphery (e.g., a flange arrangement as analogous to a sealant tube dispenser gun tube reception housing). The side wall defining the aperture provides structural support to the loader as in sole reliance on the aperture edging to provide cantilever base support for the freely suspended remainder of the loader or a combination of support plates supported with the housing by through rods at one or both ends. These additional supports can further include an extended portion of the receiver tray below. In a preferred embodiment a pair of support rods extend through spaced support plates that are axially spaced apart and fixed to the rods. The receiver tray is attached to opposing inner faces of the axially spaced support plates. Also, the receiver tray preferably has one or both end shield plates that are shaped to provide rotation support to the inserter loader.

The receiver tray also preferably is arranged so as to extend horizontally within the housing with a fixed end fixed to the interior of the same wall in which the loader aperture is formed and the opposite end extending inward into the interior of the housing for about the same distance as the loader when fully inserted. The loader is preferably supported by way of the wall edge(s) defining the side wall aperture and, at its inter-most end, by an end wall of the receiver tray. Also the interiormost end of the loader is preferably positioned just past the corresponding end of the loader to complete the partial nesting arrangement (e.g., a receiver tray end wall with a concave upper edge receiving in sliding contact the main body of the loader in a border region between the main body and interiormost loader end cap).

In a preferred embodiment there is provided a sheet metal receiver tray having side walls supported in cantilevered fashion, an apertured bottom base plate and a free interiormost end wall. In addition, there is one or more support rods extending from one end interior side wall surface to an apposite side wall (e.g., a pair of support rods extending in parallel fashion and positioned just below the receiver tray). Sandwiched between the support rods lying on a horizontal plane and the receiver tray base plate is a coiled resistance heater bar that is also preferably in a direct contact arrangement with the bottom base plate. In other words, the illustrated "wood chip" tray and/or the supporting side plates and/or rods are preferably placed in direct contact with the resistance heater bar to facilitate conductive heat transference from the resistance bar to the apertured plate supporting the smoker material in the receiver tray.

An embodiment at the invention features a border region of the housing extending about the loader aperture that provides a light friction seal arrangement between the end region of the loader and the side wall of the smoker housing. The border region also preferably includes positioning indicia or some form of markings to designate the setting position, although a non-indicia embodiment is also featured under the present invention. An alternate embodiment features proper tray position alignment means as in a key-hole-slot arrangement in the loader and border region to help an operator determine proper initial orientation which clears following sufficient axial insertion of the loader into the smoker housing (e.g. an L-shaped loader slot which allows axial insertion relative to a housing supported key projection extending into the slot area which L-shaped slot provides for rotation once sufficiently inserted. The opposite end loader cap preferably has a similar substantial sealing arrangement that provides for retraction of the loader (preferably a supported, but not completely withdrawn retraction setting) which provides retracted loader support for facilitating a reloading of smoker material while the smoker is heated up.

The providing of a sealing strip around the door also helps to maintain a previously achieved smoke/temperature setting. This sealed in relationship also facilitates the low temperature, long time period the food is heated (e.g., it is not uncommon for smoking periods to exceed 8 hours in one setting). With such prolonged times it is also helpful to have the loader tray available to restock the smoke generating material due to complete usage during a first period of the overall smoking period. This can be done in a retraction setting while the smoker is fully heated or can involve an initial dump and then a refill and insertion of the loader while the smoker is cool or before full heat up into a stand-by state until a desired point in time arises wherein the pre-loaded loader is dumped.

For situations where the heating source is charcoal or some other loose material supplied to the receiver tray (as compared to a gas or electric heat source), the fuel can also be restocked by the smoke material loader as in a process comprising supplying wood chips directly to a pile of burning charcoal in a receiver tray followed by a restocking of the charcoal to the receiver tray and then again supplying additional flavor supplying smoke generating material. In an embodiment where the heat source is an electric resistance bar and the wood chip loader is provided at the upper end of a receiving nesting wood chip tray support assembly, preferably the wood chip loader forms an upper closed off section of the receiving receiver tray.

BRIEF DESCRIPTION OF THE DRAWINGS

FIG. 9 shows a right side elevational view with tray position indicia shown;

FIG. 10 shows a cutaway view of the bottom front right corner of the smoker with loader removed, filled and aligned for insertion;

FIG. 11 shows a view similar to FIG. 10 with the loader inserted and rotated into a dumping release mode (wherein smoke generating materials falls into the receiver tray below).;

FIG. 12 shows a close up view of the loader load/unload dial positions for an embodiment of the invention;

FIG. 20 shows an alternate smoker device with an alternate fuel source.

DETAILED DESCRIPTION OF THE INVENTION

Figures 1, 1A:
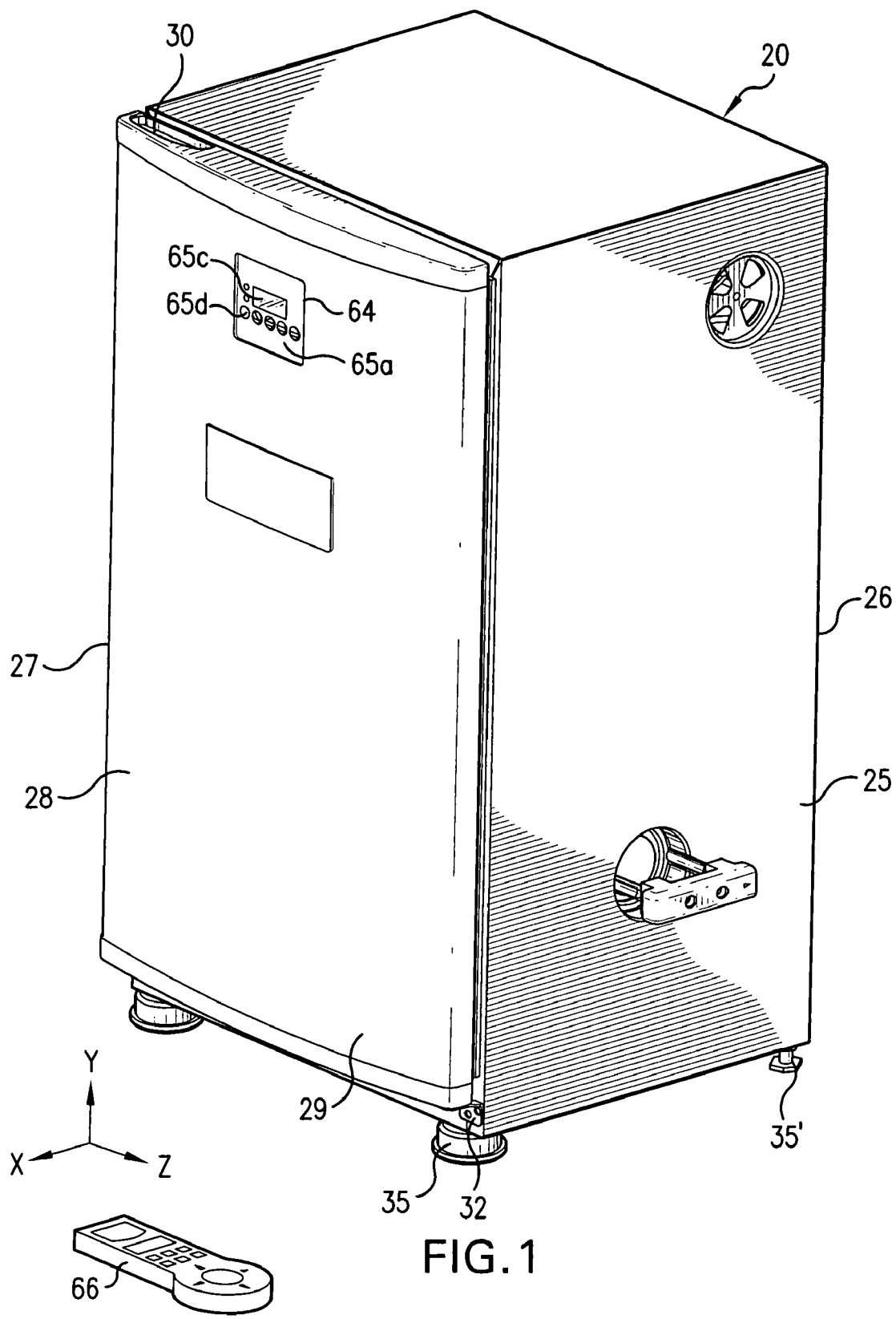
FIG. 1 shows a perspective view of the smoker of the present invention with front door closed.
Figure 2:
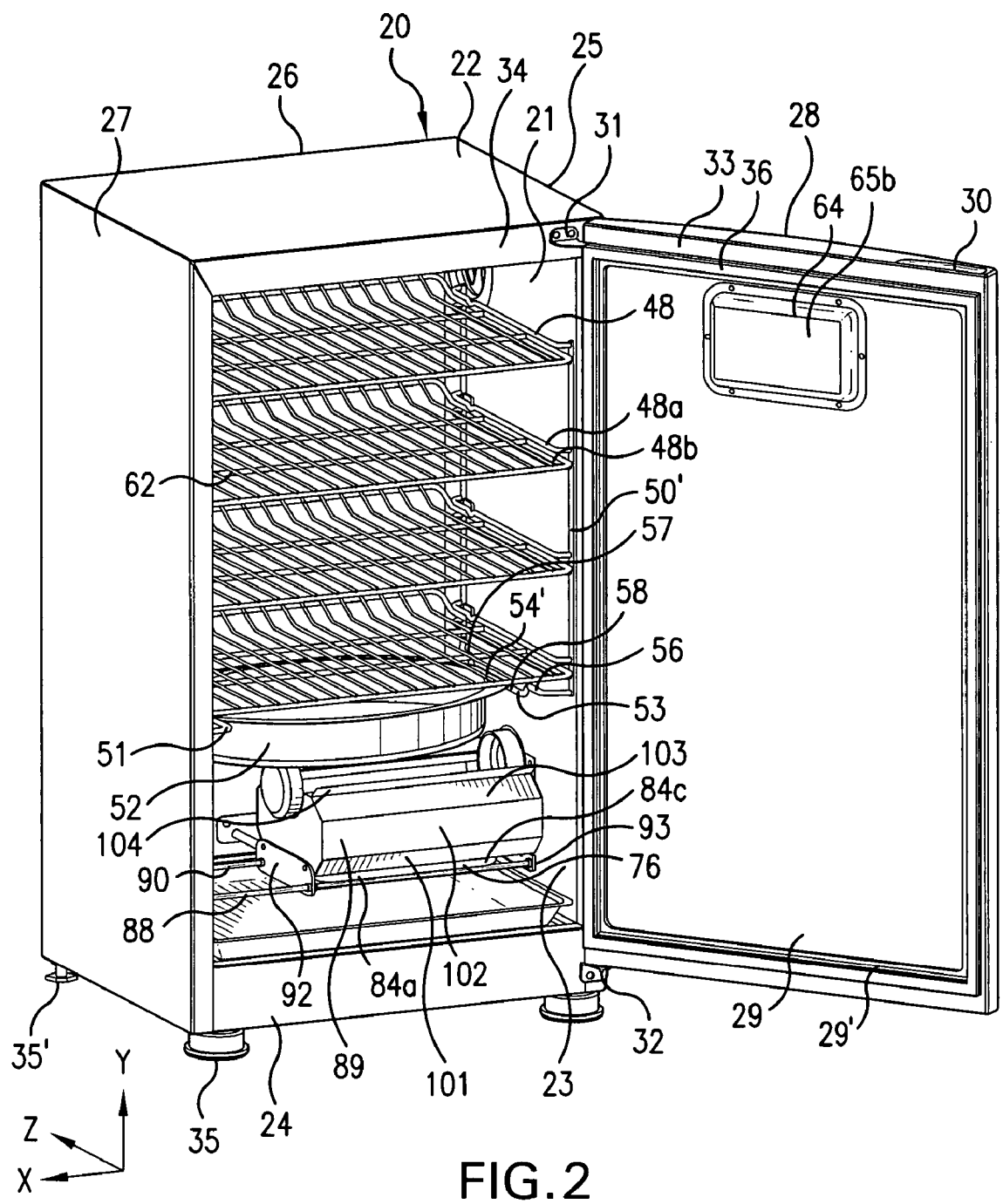
FIG. 2 shows a perspective view of the smoker with front door open.

FIGS. 1 and 2 illustrate smoker cooking apparatus 20 ("smoker") with FIG. 2 showing door 29 swung open for viewing the interior 21 of housing 22 comprised of main housing section 23 and base housing section 24. In the illustrated embodiment, smoker cooking apparatus 20 has a rectangular side wall configuration comprised of side walls 25, 26, 27 and 28. Side wall 28 is partly (or entirely) comprised of door 29 shown in FIG. 2 as having grasping handle 30 (upper edge positioning) and is supported by an upper and lower hinge assembly 31, 32 with the lower edge of the door being shown below the border between the base housing section 24 and the main housing section 23 in refrigerator door fashion.

As shown in FIG. 2, the periphery 33 of door 29 and/or corresponding edging 34 of housing 22 are designed for an airtight fit which is facilitated by seal 36 which preferably is secured within a recessed edge 29' of the door's periphery cavity. Seal 36 is arranged to partially extend out of the cavity of door 29 to assume a compression seal relationship relative to the contacting edging 34 of housing 22. Door 29 is also preferably maintained shut by an engagement device as in a magnetic attraction arrangement with a preferred embodiment being an internalized magnetized sealing strip as in an integrated magnetic material and elastic seal material combination that comes into releasable engagement with a magnetic attraction material at housing edging 34. Alternatively or in addition thereto, a magnetic or non-magnetic assembly is provided at a corresponding peripheral location on the door and housing main body for door closure-retention as in a mechanical latch assembly or electronic solenoid clasp bar, etc. In one embodiment an electronic, preferably with a local and/or remote operation function and/or mechanical key code device, is utilized. This arrangement provides a childproof safety function.

FIGS. 1 and 2 further illustrate two foot pad sets 35, 35' of two different types extending down into ground contact from the corner undersurface of base housing section 24 and one or more are preferably individually adjustable to accommodate uneven ground support surfaces (e.g., threaded post and fixed nut support). The foot pads in the front are preferably provided with covers for improved appearance and user contact protection.

Figure 4:
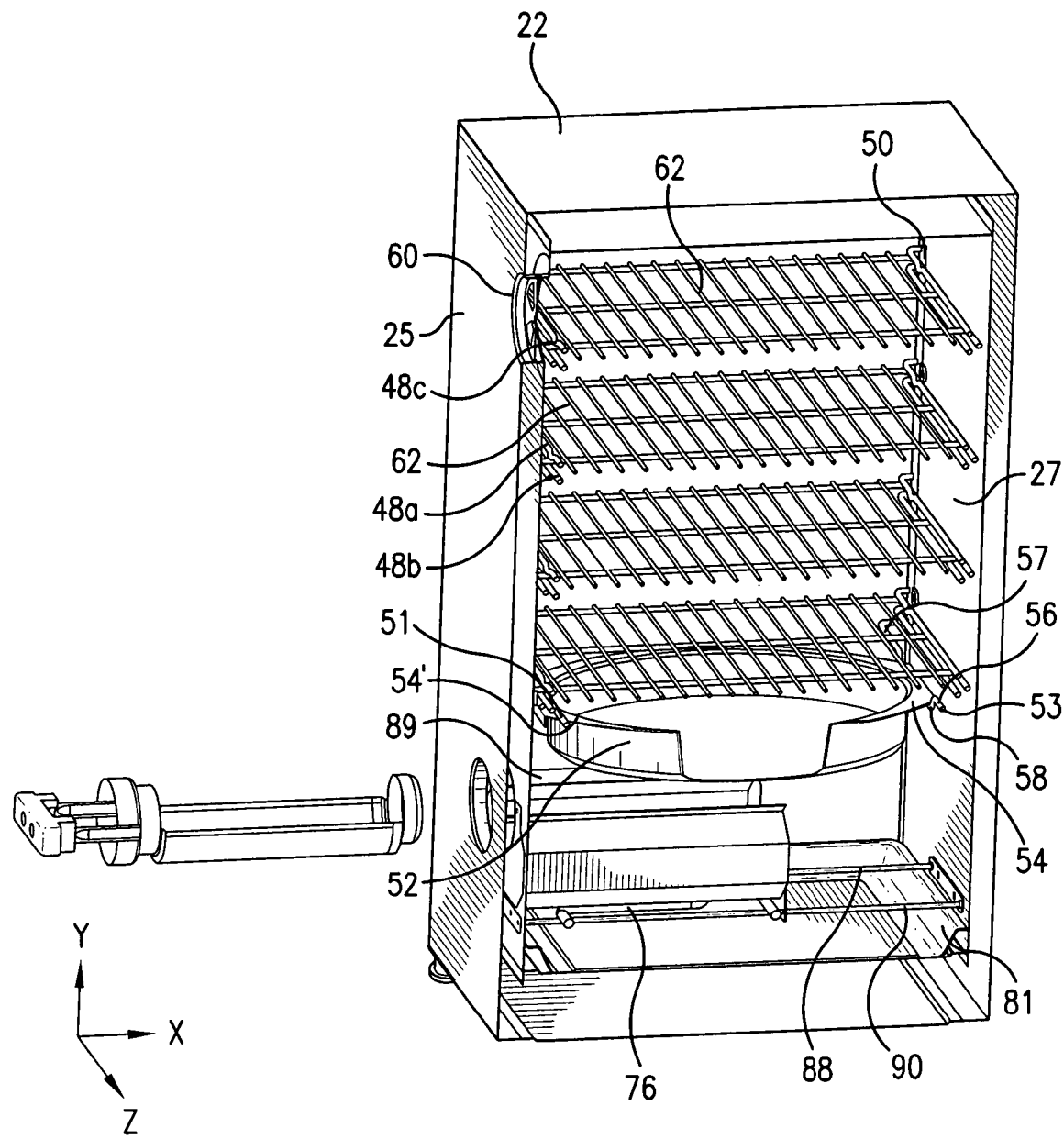
FIG. 4 shows a partially cut-away left side perspective view of the smoker with loader removed.
Figure 5:
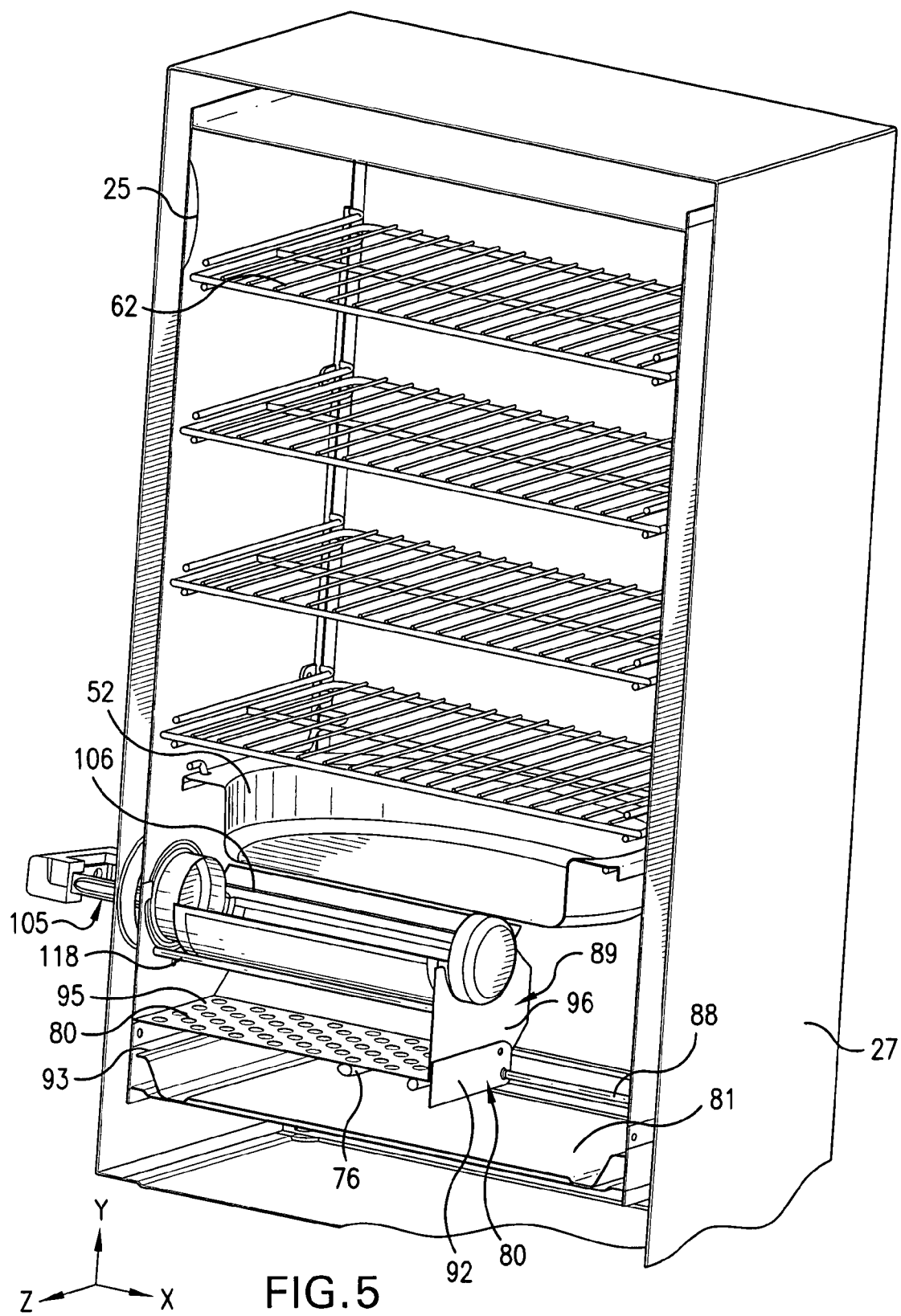
FIG. 5 shows an enlarged view of the smoker of FIG. 4 with loader inserted.

As represented by the partial cut-away views in FIGS. 4 and 5, each of the walls (front (including door), back, left and right sides, top, and bottom) preferably are each in the form of a double wall panel assembly with, or without insulation therebetween such as one or more sheets of insulating and heat resistant foam (e.g., a blown-in foam insulation panel) or non-woven fiber material (e.g., See FIG. 7) or some alternative solid insulation means or, alternatively, reliance is placed on an air pocket alone. The outer wall is preferably formed of a material suitable for the high heat environment and potential outdoor use as in stainless steel or a plastic or a composite material. The interior wall material is formed of a heat resistant material which can be of a similar or a different material as its exterior counterpart.

Figure 3:
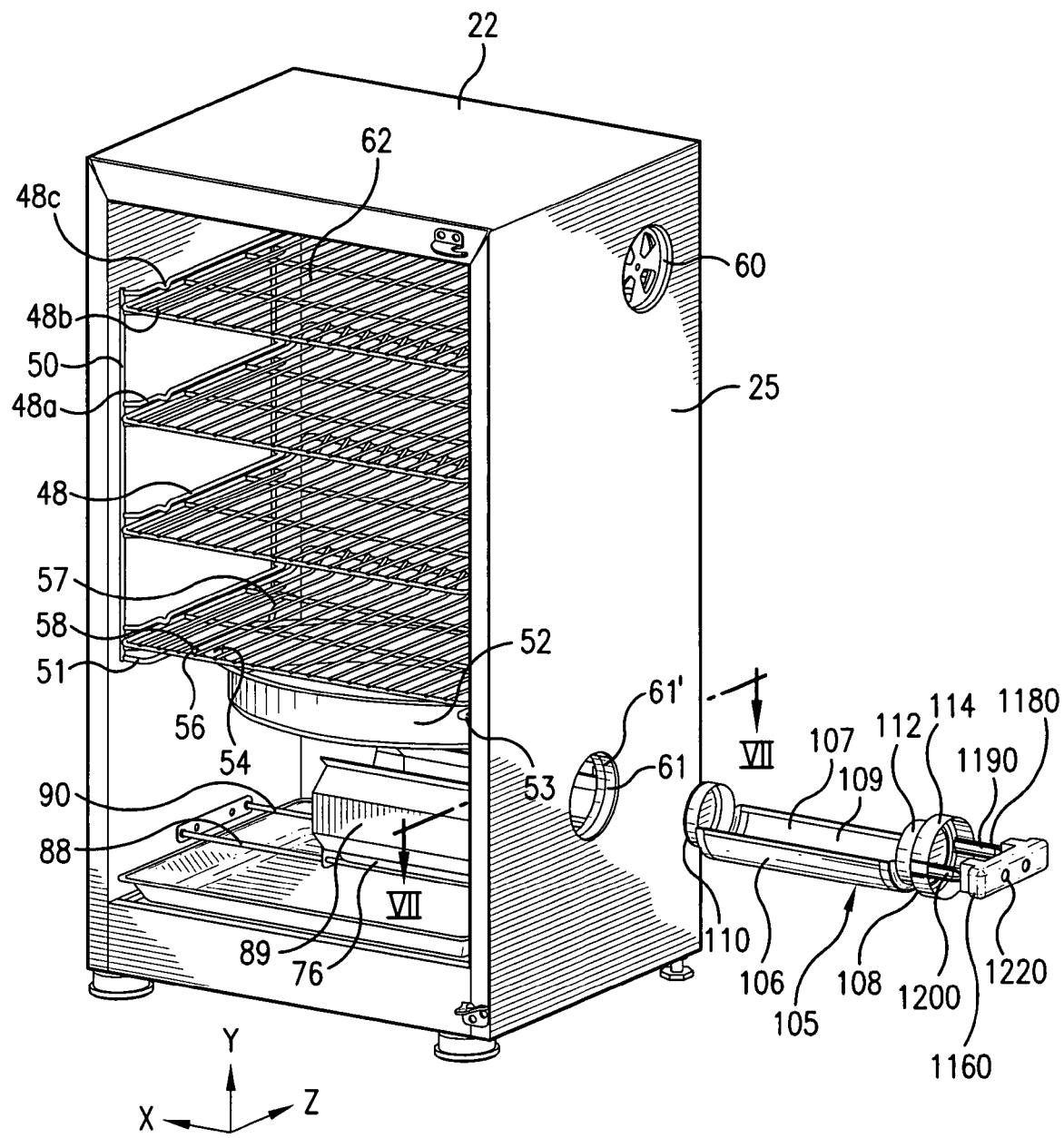
FIG. 3 shows a right side perspective view of the smoker with front door removed and loader removed.

FIGS. 2 to 4 illustrate food rack slide supports 48 each comprised of an upper and a lower slide slot defining rung 48a, 48b with the upper rung preferably having an inner, downwardly extending capture projection 48c. The rung sets on each wall are preferably formed together with a common back base (50, 50') secured with screws to respective interior wall surfaces of housing 22. Back bases 50, 50' supports a lower positioned pan support rung sets 51, 53 that support opposite sides of water/drip collection pan 52. A preferred pan 52 support arrangement features left and right pan support rung sets 51, 53 each having front and rear outer sections 56, 57 and a dipped central section 58 which receive corresponding sized flanged extensions 54, 54' of pan 52 for securing in position pan 52. Pan support rungs 51, 53 are also preferably integrated with the back base 50, 50' to provide monolithic rack bodies for securement to the noted opposing interior walls. Four individual food racks 62 are shown slidingly received within opposing food rack slide supports sets 48 above pan 52.

With reference to FIGS. 3 and 4 there is shown through hole or port 60 formed in an upper, back region of side wall 25 which provides exhaust and/or intake port means for exhausting combustion waste gases and/or providing an oxygen intake. Although not shown, an additional embodiment of the inventions includes an aperture opening and adjustment cover assembly as in one having an inner aperture plate that is fixedly supported and a second aperture plate that is pivotably adjustable (e.g., with an outer finger flange and central pivot relative to the first aperture plate). In this way an adjustment to a desired full opening setting with fully corresponding apertures or a partial setting with partially corresponding apertures or a closed off setting wherein the apertures of the outer plate are between apertures of the inner plate is made possible. In addition port 60 also provides a suitable ducting location for gas passageway as in a duct extending from an internal relatively closed off environment (e.g., house or shed) to a less closed in environment. An alternate embodiment includes an essentially sealed off arrangement free of intake/exhaust port like port 60.

Figure 8:
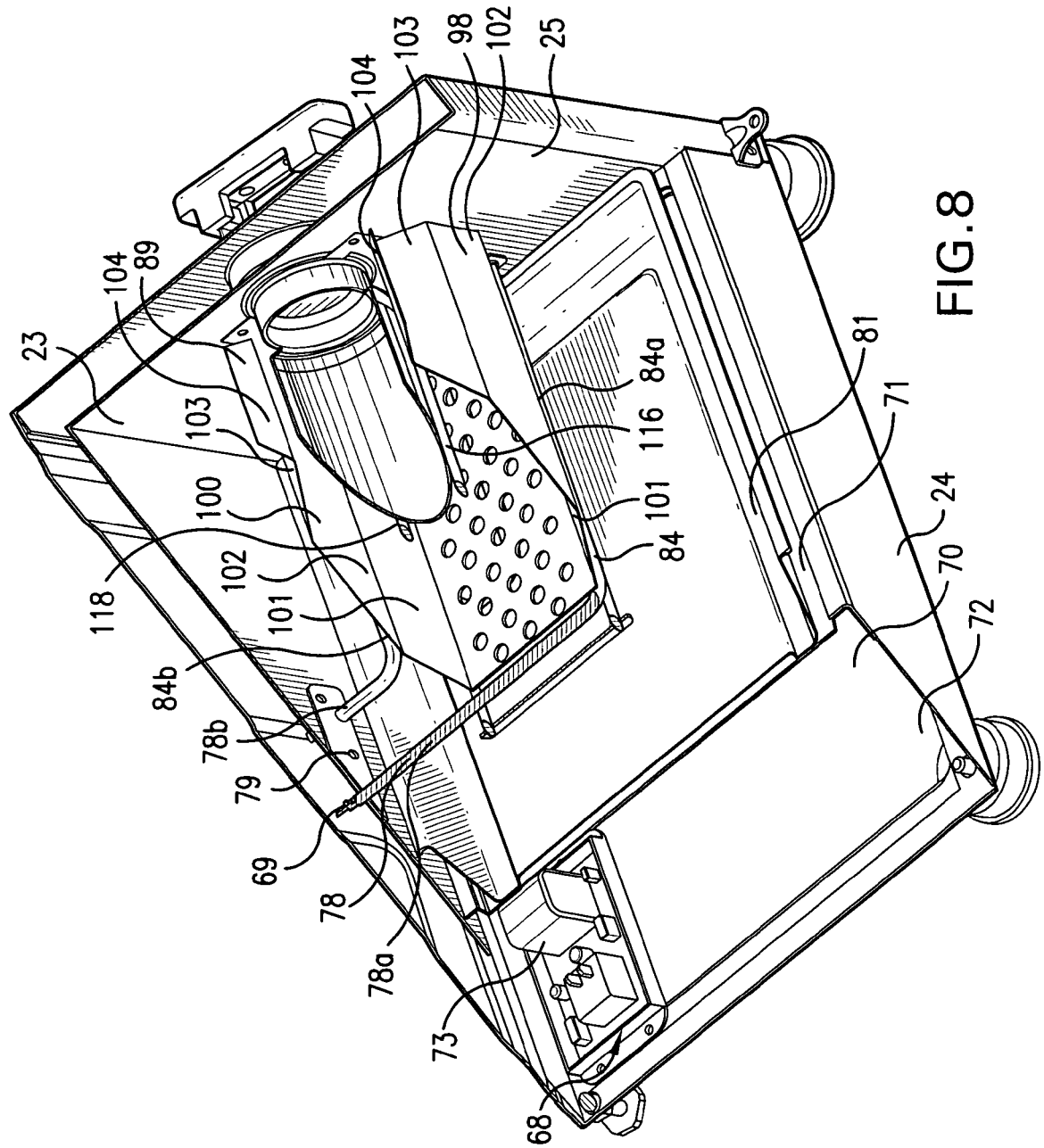
FIG. 8 shows in cut away a portion of that which is shown in FIG. 7.
Figure 13:
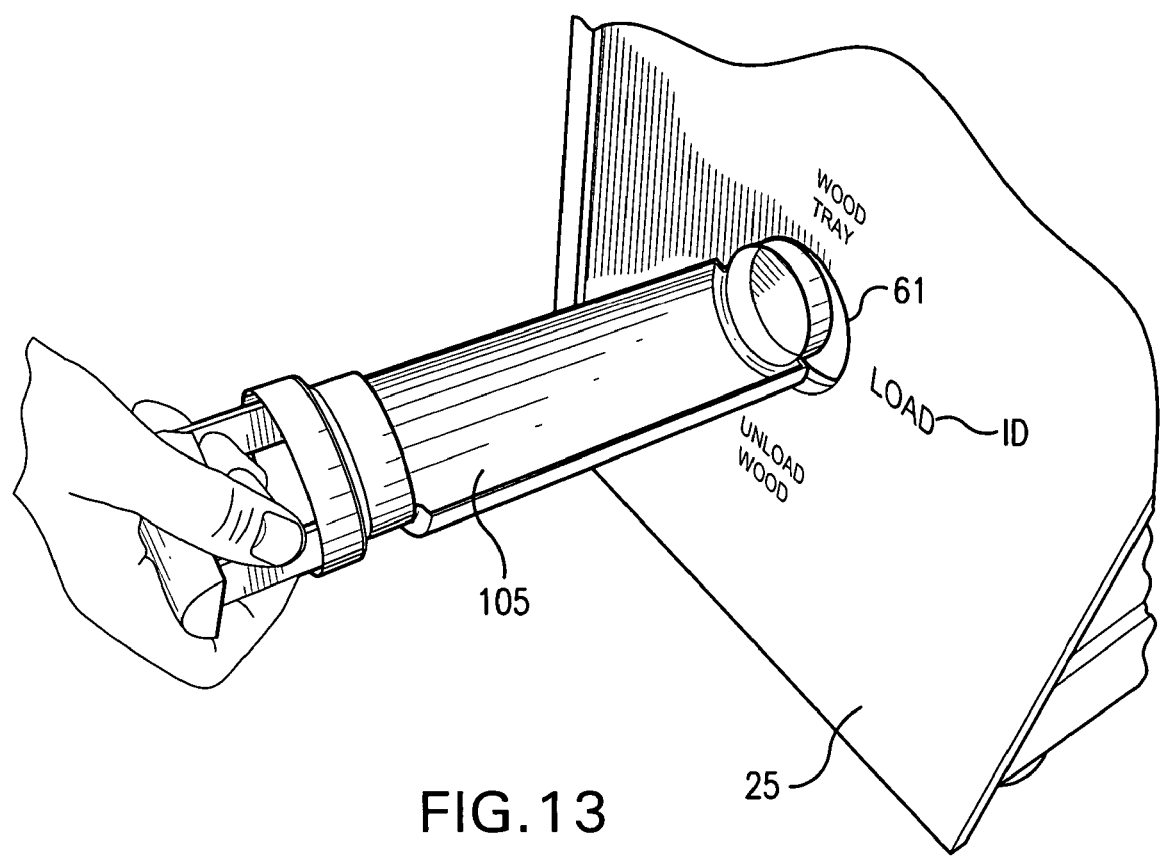
FIG. 13 shows more detailed view of the loader for supplying wood chips or the like in position for insertion into the smoker housing.
Figure 14:
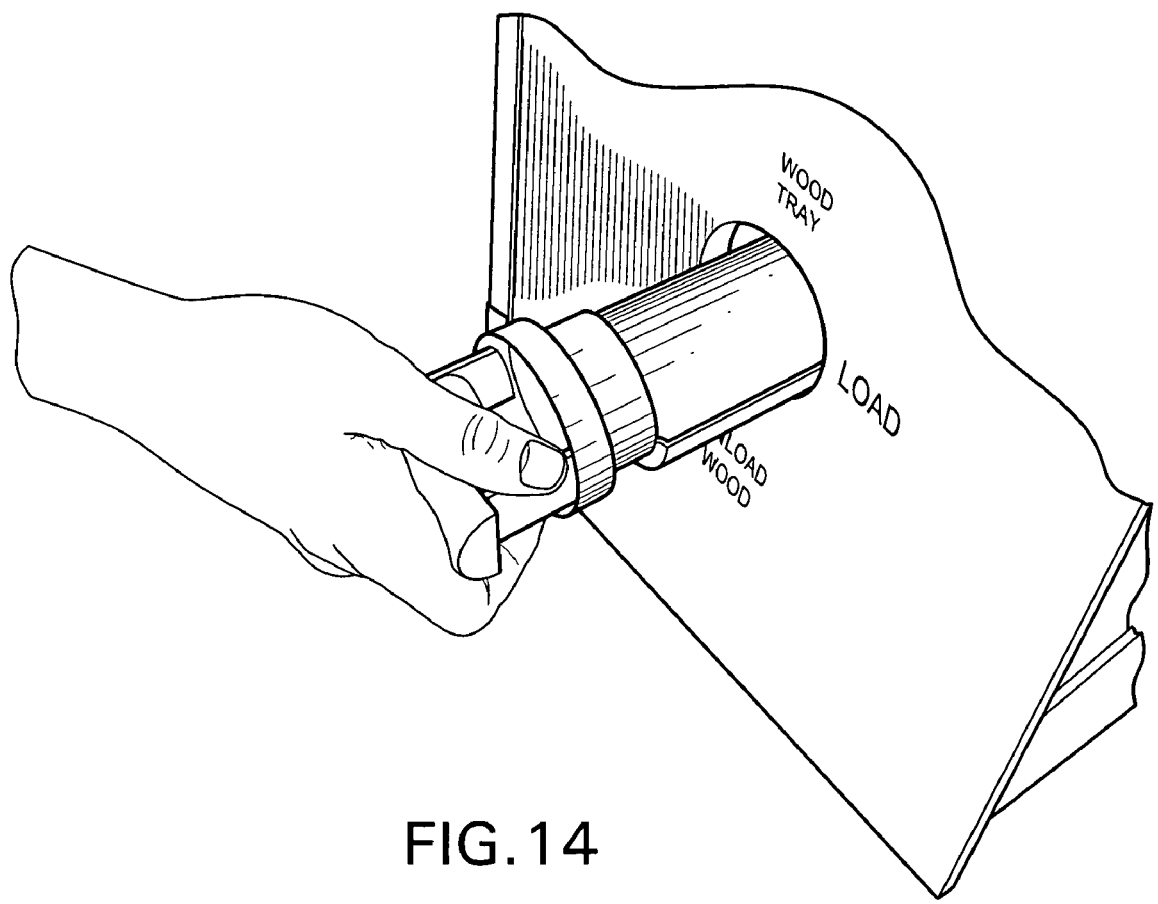
FIG. 14 shows the smoke material loader in the process of being inserted into the housing (in an empty state for illustration of a wood chip reception cavity as it would be typically filled with smoke generating material and/or some other material as in fuel supply material)

FIGS. 1 and 2 further illustrates control panel assembly 64 having front panel face 65a and a rear (internal) panel face 65b (control panel assembly 64 probably comprises both visual indicators (e.g., temperature and time visual indicators) 65c (e.g., LED displays or mechanical dials, etc.) and smoker character adjustment means 65d to alter, for example, the smoker duration time, the desired temperature setting(s), an "on/off" functioning arrangement, a key code if an electronic door lock is utilized, etc.). The time settings and temperature settings are also preferably adjustable via a remote device (e.g., activator) 66 shown in FIG. 1, which sends (e.g., digital systems based signals) direction signals either directly to control panel assembly 64 or indirectly via control assembly 68 (FIG. 8) with the latter preferably including electronic components for time adjustment means, power line input etc. Control assembly 68 is shown in FIG. 8 as being within the false bottom compartment 70 formed between floor panel 71 forming the bottom of main housing section 23 and panel 72 forming the bottom of base housing section 24, and with control assembly 68 shown mounted to panel 72 of base housing section 24. As shown in FIG. 2, there is further provided base pan 81 (e.g., an ash pan) which provides a final drip and ash capture means and can be slid in and out along the upper surface of floor panel 71 when the door is open and the smoker sufficiently cooled.

For remote activation, transceiver/receiver assembly 73 shown in FIG. 8 is provided as part of control assembly 68, although various alternate signal receiver and/or transmitter arrangements are featured as in a combination transmitter/receiver or an independent transceiver and receiver arrangement fully positioned within the door supported control panel 64. Preferably a wireless communication system is utilized to achieve the adjustment and monitoring of the smoker characteristics as in time, temperature and on/off status, loader adjustment, etc. as described above through use of either or both of control assembly 68 and control panel 64. Further, the transmission reception function is preferably bi-directional with, for example, the remote 66, having a display to provide smoker characteristic displays on a real time basis as in status information of the current smoker temperature and/or for smoker time remaining there is featured a single directional arrangement wherein the display is not present on the remote, only on the housing as in front panel face display 65c.

Control assembly 68 further preferably includes a heating temperature control system such as those used to control the temperature of conventional ovens (e.g. via current to resistance adjustments). Heating temperature control 69 (FIGS. 6 and 8) is placed in communication with a heat source as in the illustrated heat resistance bar 76 preferably by direct wiring between control assembly 68 and heat resistance bar 76 as shown in FIG. 8, heat resistance bar 76 has an L-shape loop configuration with a shorter bar section 78 comprising two parallel bar sections 78a, 78b extending out from support plate 79 and has electronic connection terminals (not shown) extending into communication with control assembly 68 which includes means for altering the current supply in the bar to alter the temperature of the heater and preferably also a temperature level sensor to compare to and maintain a preset temperature once a desired level is set.

Figure 6:
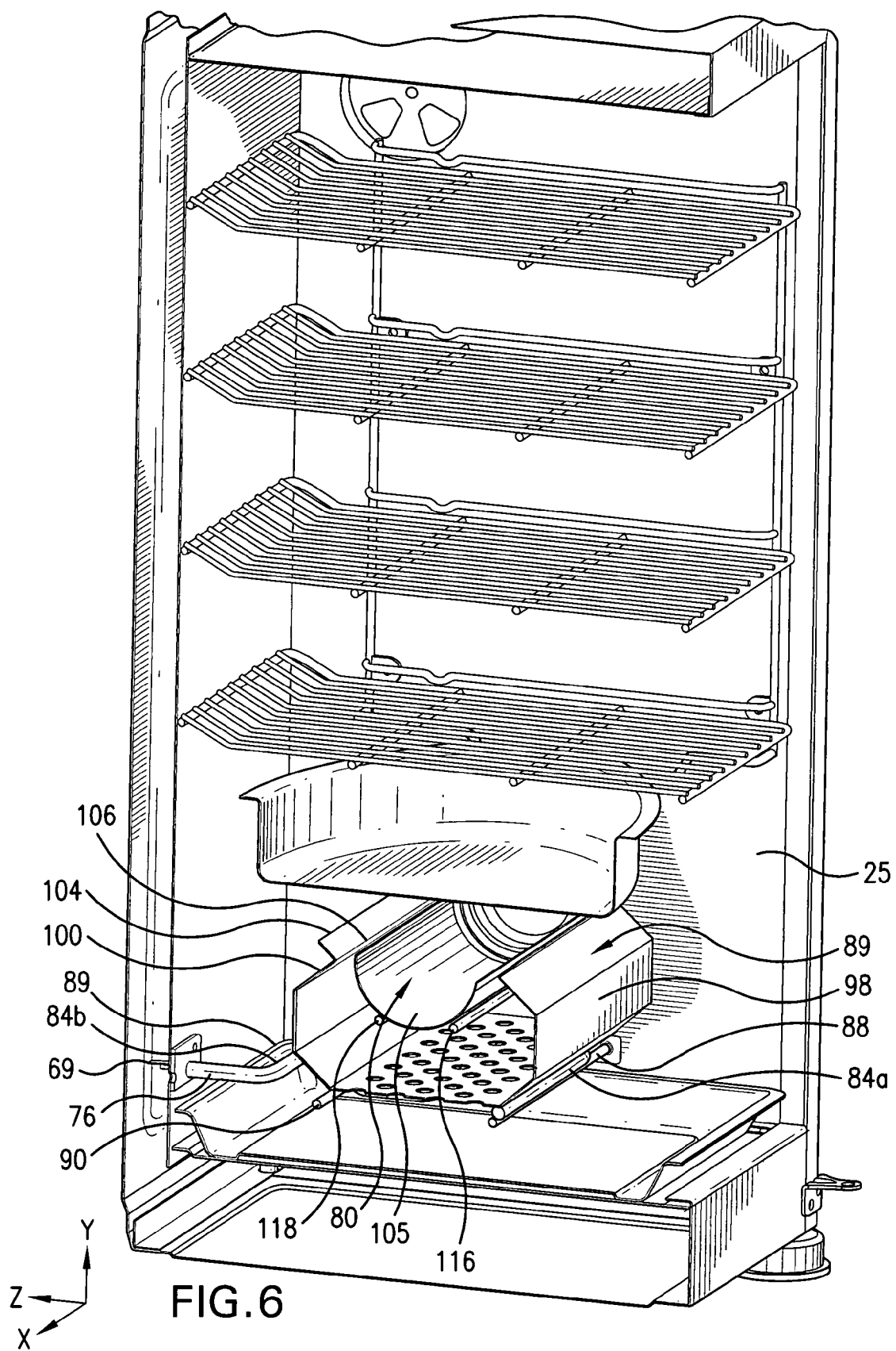
FIG. 6 shows an interior view of the smoker with left and front wall removed.
Figure 7:
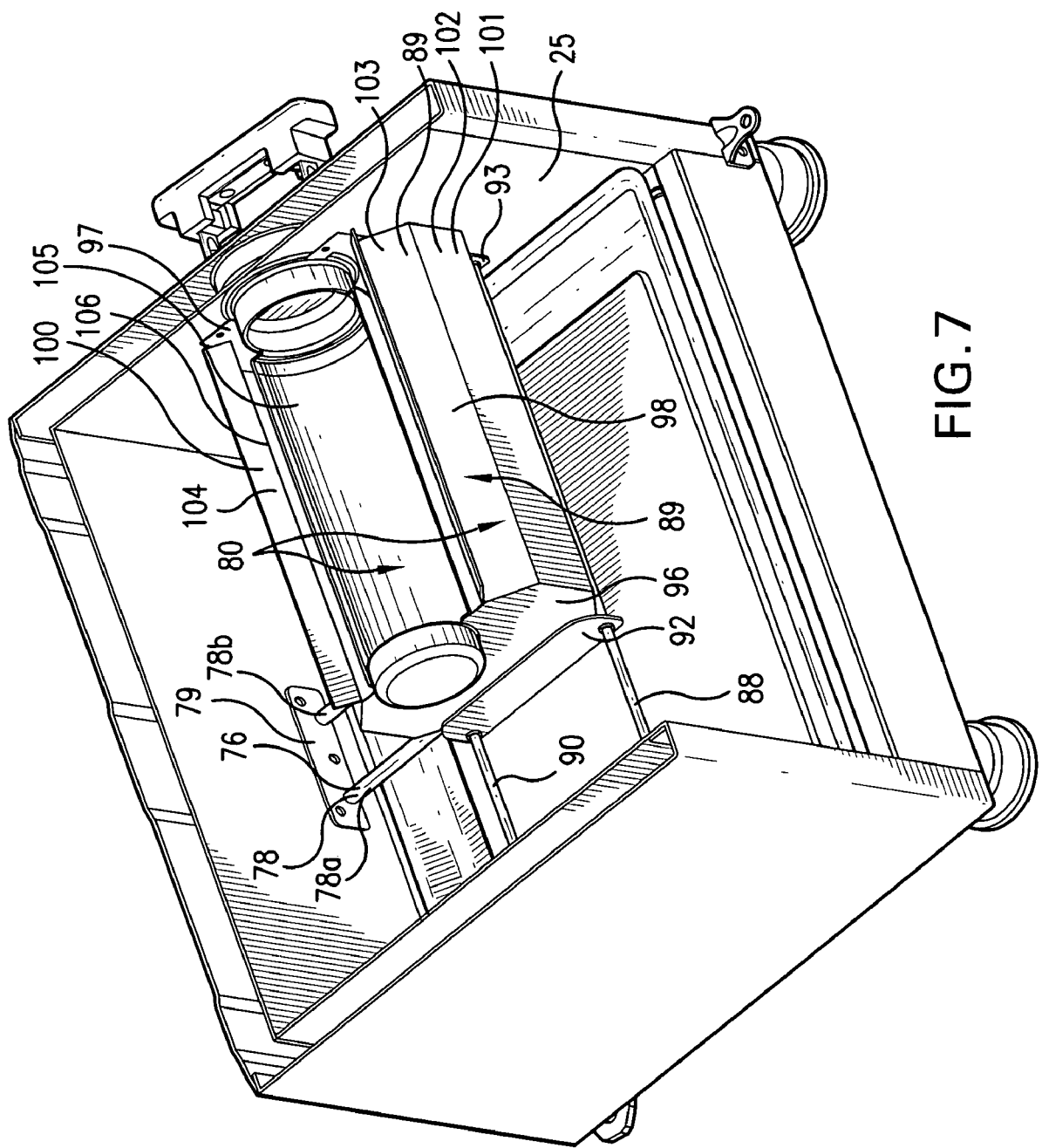
FIG. 7 shows a cut-away view of the smoker taken along cross-section line VII-VII in FIG. 3.

The first leg set 78 of resistance bar sections (78a, 78b) is shown in FIGS. 6 and 7 as extending internally into the smoker apparatus away from back wall 26. The second leg 84 of the heat resistance bar 76 comprises a second set of parallel resistance bar sections (84a, 84b) extending transversely off from unequal length sections 76a, 76b to define the overall L-shape loop construction. Bar sections 84a, 84b extend toward side wall 25 near where the L-shaped heat resistance bar coil is completed by way of an end cap heat resistance bar loop section 84c (FIG. 2) extending between the free ends of 84a, 84b. Heat resistance bar 76 extends out from its support location at support plate 79 into a suspended, cantilever state within smoker chamber 21 relative to the interior surface of the housing walls. The cantilever arrangement is preferred together with a direct contact relationship with the smoker material recover tray 89 but not preferably a resistance bar support of the receiver tray arrangement. Rather, additional support rods 88 and 90 are preferably provided to provide the bulk of support to the receiver tray. While a heat resistance coil embodiment is preferred for an electrical based embodiment of the present invention, alternate electrical based heating units such as infrared ceramic plates heaters or electromagnetic wave heaters (e.g., infrared and microwave spectrum wave levels) are also featured under the present invention. Alternate heat sources such as non-electric heat sources (e.g., combustion as in charcoal and coal with associated combustion material support tray or the like) are also featured under the present invention.

As shown in FIGS. 2, 3 and 6 support rods 88, 90 extend parallel with section resistance bar sections 84*a*, 84*b* and into fixed engagement at opposite ends of housing walls 25 and 27 and are shown spaced away from sections 84*a*, 84*b* to avoid direct contact therewith. Support rods 88, 90 provide a stable base for supporting smoker material receiver tray 89. As shown in FIGS. 2 and 7, interior brackets 92, 93 extend across at respective spaced apart locations along the length of fixed support rods 88, 90, with the main internal bracket 92 being in a central region of the housing chamber and bracket 93 being closer to the interior wall as in a direct contact relationship. As shown in FIG. 7, at a lower end of bracket 92, rods 88, 90 extend through receiving apertures provided in bracket 92 to support the bracket 92. The upper region of bracket 92 is secured to interior end wall plate 96 of receiver tray 89. Although bracket 92 and plate 96 are shown as secured individual components alternate load support means are also featured under the present invention as in monolithic plate structure, vertically extends support bars, etc. There is also preferably provided a corresponding end tray plate 97 shown in FIG. 7 in a preferred direct contact arrangement with the interior surface of wall 25. FIGS. 5 to 8 illustrate a preferred arrangement for base plate 95 of receiver tray 89, which includes a series of apertures 80 to provide for ash drop into base pan 81. First and second brackets 92, 93 are shown secured to the ends of apertured base tray plate 95, with bracket 93 shown as an angle bracket with flange extension providing below plate 95 support and bracket 92 fixed either directly or indirectly via end tray plate or end shield 96 in transverse fashion to the horizontally oriented base tray plate 95. The support arrangement is also such that the smoker material receiver tray 89 is in direct contact with heat resistance bar 76 which facilitates heat transfer with side wall shields 98, 100 extending upwardly up from or the elongated sides of apertured base plate 95. Thus a preferred arrangement for smoker material receiver tray 89 comprises an enclosure defined by one or more end tray plates or end shields 96, 97 (e.g., the interior surface of wall 25 can be used in place of plate 97 if sufficiently robust) side shields 98, 100 extending between and in contact with end plates 96, 97 and base plate 95 which is preferably apertured to provide for gravity release of waste products as in ash from smoker material combustion (preferably a slow smoldering smoke generating combustion). Apertured base plate on which smoke generating material is placed is preferably positioned in close proximity with the heat generating source as in 0 to 6 inches with 0 representing the aforementioned direct contact relationship and more preferably 0 to 2 inches as in less than 1 inch spacing. For situations where non electric heat generating means material is utilized as in a heat supply based on a combustible such as charcoal, the support surface in the housing which receives the combustible material is arranged so as to place the combustible in close spacing with the smoke generating means as in 0 to 6 inches with "0" including either direct contact with the combustible in use with the apertured plate 80 or alternatively the common usage of apertured plate and receiver tray 89 in general as recipient of both the combustible and smoke generating material in a direct contact, intermingled, relationship.

The preferred heat resistance bar/tray contact arrangement places each of the long edges of an apertured, rectangular base tray plate 95 in contact along their full length with the respective, adjacent resistance bar sections 84*a*, 84*b* and/or shields 98, 100, which extend vertically up from the tray plates long edges. In this way, there is an extended length of direct contact heat conduction to base plate 95, and/or shields 98, 100 (depending on relative positioning of each). Shields 98, 100 are shown to be multi-paneled shields, that include opposing, mirror image opposing panel schemes. The illustrated shields 98, 100 each comprise panel sections (101, 102, 103) which are best shown in FIGS. 6 and 8, as well as an upper, outer breakout panel section 104 which, in conjunction with the immediately below supporting panel 103, defines elongated "V" shaped shield rims on each side with apex edges 106 (FIG. 7). The opposite end of shields 98, 100 is preferably fixed (e.g., directly or integrated as in a monolithic stamped plate) to the interior surface of wall or to an adjacent bracket. Base plate 95 is further shown to be the upper component in overhead stacking arrangement of rods 88, 90 at the lower level, and intermediate heat resistant coil 76 preferably spaced above rods 88,90 and an above positioned base plate 95 shown in contact with heat resistance coil 76.

Receiver tray 89 is arranged for receipt of smoker material from loader 105 with loader 105 preferably being in a nested arrangement within receiver tray 89 as well as preferably in a support relationship as with end receiver tray plate 96 providing an interior support surface (e.g., in a sliding contact concave upper edge support arrangement). The housing itself also preferably provides additional support to the loader as in opposite loader end contact via the loader reception surface of housing 22 defining aperture (61, FIG. 3), which aperture 61 further provides an insertion and retraction location for loader 105. Aperture 61 is shown provided in wall 25 to have a degree of vertical height overlap relative to shields 98,100 once inserted. For example, with a preferred circular aperture 61, the aperture's positioning is preferably arranged relative to the shields such that the shields extend up to the upper half way point of a vertically oriented diameter line defining aperture 61. In addition, the shields 98,100 preferably are spaced apart greater than that diameter, with the upper rims 104 defining a receiver tray constricted portion (minimum spacing location) which is preferably slightly larger than the aperture diameter (e.g., less than a ½ inch and more preferably less than a ¼ inch) and which define a limited clearance space an each side for a centered circle defined by said diameter and positioned an equal amount to opposite sides of the mirror image rims 104 with constricting edges 106. The constricted arrangement provides a degree of heat containment relative to inserted loader and receiver tray combination 80 (FIG. 2), which are preferably arranged with nesting components.

As shown in FIG. 3, loader 105 of combination 80 includes loader main body 107 which features a recessed load area 109 designed to receive smoker material for introduction to receiver tray 89. In a preferred embodiment the loader's main body 107 comprises a semi-cylindrical vessel 106 with an upward facing concave cross-section and end caps 108, 110 designed to generally conform to the aperture size 61 as to allow for a sliding in of the loader 105 without extensive spacing. For example, a smooth sliding arrangement wherein the end cap is designed for a sliding friction fit and a general sealing effect once loader 105 is inserted into its dump ready or fully inserted position shown in FIG. 5 (absent smoker material to dump for added visual clarity). The preferred supporting arrangement for loader 105 involves end cap 108 in a supporting relationship with housing edging defining aperture 60 in wall 25 (e.g., a double wall panel with or without or partially bridging flanging with a full bridging flange 61' shown in FIG. 3). Preferably, the axially spaced edging of the interior and exterior wall panels for wall 25 provides a spacing which results in the end caps 108, 110 extending across the respective wall panel spacing of wall 25 or therepast.

End caps 108 and 110 (FIG. 3) also preferably have an axial thickness so as to assume a cylindered ring from such as one conforming to the axial thickness of the double wall panel cylindrical aperture 61. In a preferred embodiment end cap 110 is a two stage end cap with a first cylindrical ring 112 and a second cylindrical ring 114 larger in diameter from the first ring with the larger diameter ring having the above described generally conforming diameter to that of aperture 61 to provide support and also sufficient surface area to provide a secure location for handle 1160 (FIG. 3) which in the illustrated embodiment comprises a U-shaped bracket 1180 having extended legs 1190 and 1200 fixed (e.g., a weld or some other permanent or releasable (screw) securement means) to the interior annular surface of cap section 114 (so as to avoid interference with a smooth rotation and substantially sealed off arrangement between the exterior surface of cap section 114 and the receiving surface defining aperture 61). The central bridging portion of U-shaped bracket 1180 provides an attachment base for handle grasp 1220, preferably formed of a lower heat conductivity material as in a wood or plastic grasp. Handle 1160 also preferably has an elongated configuration with a length preferably equal to the maximum housing loader reception aperture width (e.g., diameter of aperture 61), which length provides for full hand grasping between legs 1180 and 1200).

In addition, side wall shields 98, 100 extend up to vertically overlap (e.g., a partial or full overlap) both main body 107 (e.g., the upper side edges of body 107 which are substantially horizontally coincident with the mirror image V-shaped rims' apex edges 106) representing the innermost extension portion of shields 98, 100).

As seen from FIGS. 3 and 7, loader main body 107 preferably has a true semi or half cylindrical configuration with the smoker material supporting main body 107 occupying ½ of a full cylinder which is designed to provide a smoker material loader capacity sufficient for handling intended usage for the preferred single load dump for resupply during a smoker cycle (e.g., a ½ to 5 lb. bag smoker material reception volume (e.g., one or two)1¾ lb. smoker chip bag insertion capacity without overflow from the recessed loading area 109 of the loader main body 107. For example, a 3 inch to 1 foot diameter main body with ½ foot to 2 foot axial extension between end caps (108, 100) is illustrated of a preferred loader body size, although various other sizes are featured under the present invention based on desired needs of the operator and configuration of the smoker in general. End cap 108 extends deepest into the smoker when loader 105 is fully inserted in a rotary support arrangement. With loader 105 fully inserted, the opposite end cap 110 is designed to plug insertion/retraction aperture 61 and generally seal off aperture 61. End cap 110 is preferably sized either the same as ring 114 for easy initial insertion or of common size with the larger ring 114 to provide a retracted loader (but not removed from housing ) support and plug seal arrangement.

As shown in FIGS. 5, 6 and 8 for added stability, extension rods 116, 118 are provided and extend within the confines defined by shields 98, 100 and are further preferably arranged to extend from a first fixed support location at the interior surface of wall 25 (or end tray plate 97) to end tray plate 96 supported by the vertically extending bracket 92 through which rods 98, 100 extend. Extension rods 116, 118 are spaced apart so as to be positioned in lower quadrant regions of the loader tray main body and are designed to not obstruct rotation freedom for main body 109 or interfere with the smoker material unloading process described below. The extension rods 116, 118 provide an added degree of structural integrity to receiver tray 89 and are preferably spaced away (e.g., within a ½ inch) but relatively close to loader main body 107. A closer, slide contact arrangement (not shown) is also featured under the present invention to provide additional body support to the rotating main body 107.

FIGS. 9 to 12 illustrate somewhat schematically, and in cut-away fashion, a filled loader 105 insertion and dumping of smoker material SM (e.g., wood chips) into reception tray 89 with an alternate solid handle 1160' embodiment with central grasping knob 1220' which represents an alternate form of handle for dialing, but the load handle discussion above is applicable to this embodiment. The embodiment of FIGS. 9-12 also show an alternate temperature and/or timer adjustment control unit CD at the base of smoker 20. The embodiment of FIGS. 9-12 further illustrate position and instructional indicia ID provided on the exterior of wall 25 with "load" and "unload" being representative and being 180° apart, with the handle grasp itself having a reference marker RM to show whether load or unload is currently applicable (e.g. an arrow designation or an inherent in grasp handle shape arrangement or both.

Handle 1160', having grasp portion 1220' (preferably a low heat conduction type as in a wood dowel with direction indicia RM (FIG. 12), is grasped by an operator at the grasp portion 1220' without too much heat conduction passed to the grasping hand. The operator is aware of the present state of the loader based on reference indicia RM and the status indicing (e.g., "load" and "unload" indicia ID provided on wall 25). The axial extension of the handle grasp 1220' out away from loader end 108 also facilitates rotation of the loader between ready to dump state shown in FIG. 10 and the actual dump state shown in FIG. 11.

FIG. 10 illustrates loader 105 filled with smoker material SM in a ready-to-insert into housing 22 state. FIG. 10 further illustrates the lining up of the filled loader (e.g., "wood tray" in this particular embodiment) aligned for insertion into the smoker chamber 21 via aperture 61 in side wall 25. As shown, the central axial axis of loader 95 (commensurate with the dumping axis of rotation of loader 105) preferably falls on a common vertical plane VP with the parallel, central bisect axial line of receiver tray 89. In other words, the noted central axis of loader 105 and the central bisect axis of tray 89 preferably substantially coincide with the denoted vertical plane (e.g., within ±10° of VP at 0°). Alternate, non-aligned arrangements as in ±10° to 30° offset from VP at 0° is also an arrangement featured under the present invention with or without an added guide (not shown) as in an added slide chute slopping between the loader and below positioned receiver tray for guiding smoker material from an unloading loader to the receiving area of the receiving tray 89.

FIGS. 13 to 16 provide an external view showing the supply or resupply process for smoker material (and/or combustibles) with loader 95 which includes, for example:

a) Supplying smoker material SM to loader 105 (not shown in FIG. 13 to 16 for added visual clarity of loader) as in opening a bag of SM and pouring smoker material into the main body 107;

b) aligning the rotation axis of the loader with the center of aperture 61 with the loader positioned for smoker material retention (e.g. the semi-cylindered main body's top opening facing upwards);

c) sliding loader into aperture 61 and into chamber 21 of smoker housing 22 which involves, with the loader position continuing to be in a smoker material retention position, sliding of the loader into the housing until receiving a preferred or plug aperture relationship wherein aperture 61 is essentially closed off by end cap 110 of loader 105;

d) adjusting (e.g., rotating) loader 105 (as in a 180° rotation) to remove smoker material SM from loader 105 for receipt within receiver tray 89 (e.g., a turning upside down of loader 105 through rotation to enable smoker material SM to drop of freely out into a below position and receiver tray 89) and preferably continuing to return loader 105 back into its original "no dump" insertion orientation;

e) retaining the inserted loader in position during the smoking process (preferably while retaining a sealing plug relationship return to aperture 61) following dumping and either following a return to the original no-dump loader position or while the loader remains in the dump orientation.

The present invention also comprises retracking the loader following the above sequence (e.g., a complete withdrawal and removal of loader 105 from the housing or a non-full withdrawal or retraction as in a switching of locations of end caps 108 and 110 relative to the side wall 25 section defining aperture 61. The end caps preferably having a common exterior maximum section (e.g., diameter) to provide a common plugging effect at each position. Following loader retraction additional smoker material SM can be loaded either for use in a subsequent smoker process or cycle (the loader preferably being sufficiently spaced at both an inserted state and a retracted state from heat source 76 to avoid smoking of the smoker material SM until dumped to receiver tray 89 or a resupply dumping process is scheduled in accordance with the above described receiver tray resupply of smoker material during a common food smoking cycle. As also seen from FIG. 10 and the sequence shown in FIGS. 13-16, the smoker material SM is loaded within main body 107 and generally below the upper edge of the end caps or sufficiently low enough to avoid insertion complication relative to aperture 61. Once inserted, the handle grasp indicia (e.g., RM) reference (e.g., points) to the load status based on a readily observable (smoker material on top of main body 109) user insertion. To achieve an unloading of the wood chips, an operator grasps the handle grasp 1160 and rotates the loader sufficiently to have the smoker material SM contents drop into the receiver tray below such that the smoker material smokes (e.g., smolders) due to the heat provided by the heat source as in heat resistant coil 76' and the low oxygen environment in the smoker chamber 21. The open top of the main body 102 provides for ready release in the illustrated embodiment and a 180° rotation is preferred with or without rotation stops (e.g., a 180 one-way as in clockwise, then 180 the opposite way, as in counterclockwise sequence, or a continuous 360 turning cycle in going from loaded-unload-ready to load status). In addition, the arrangement of the heat shields 98, 100 as in the above described nesting relationship helps avoid smoker material spill outs as the closeness and configuration of the tray 89 (e.g., V-shaped rim arrangement 104) helps retain the smoker material SM until the desired point of loader dump positioning (e.g., fully rotated upside down so that the wood chips fall directly into tray 89 with the bottom surface of the loader main body capping the reception region). As shown in FIG. 9, the central axial axis of loader 95 (commensurate with the illustrated rotation axis) preferably falls on common vertical plane with the central bisect axial line for tray 89 such that the smoker material drops along the vertical plane once the open topped loader is flipped.

Figure 15:
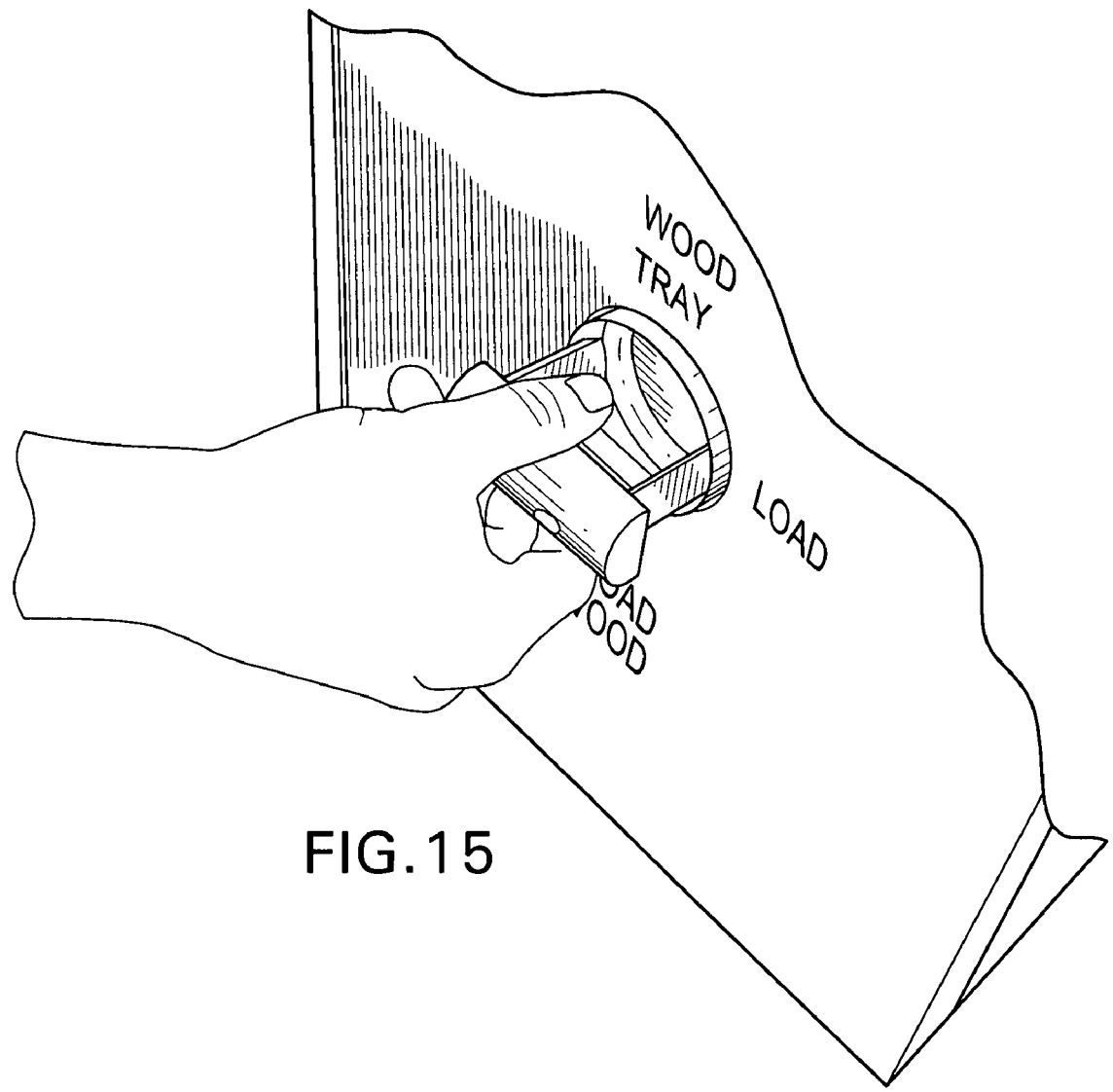
FIG. 15 shows the loader in a full insertion state and in a non-dumping mode.
Figure 16:
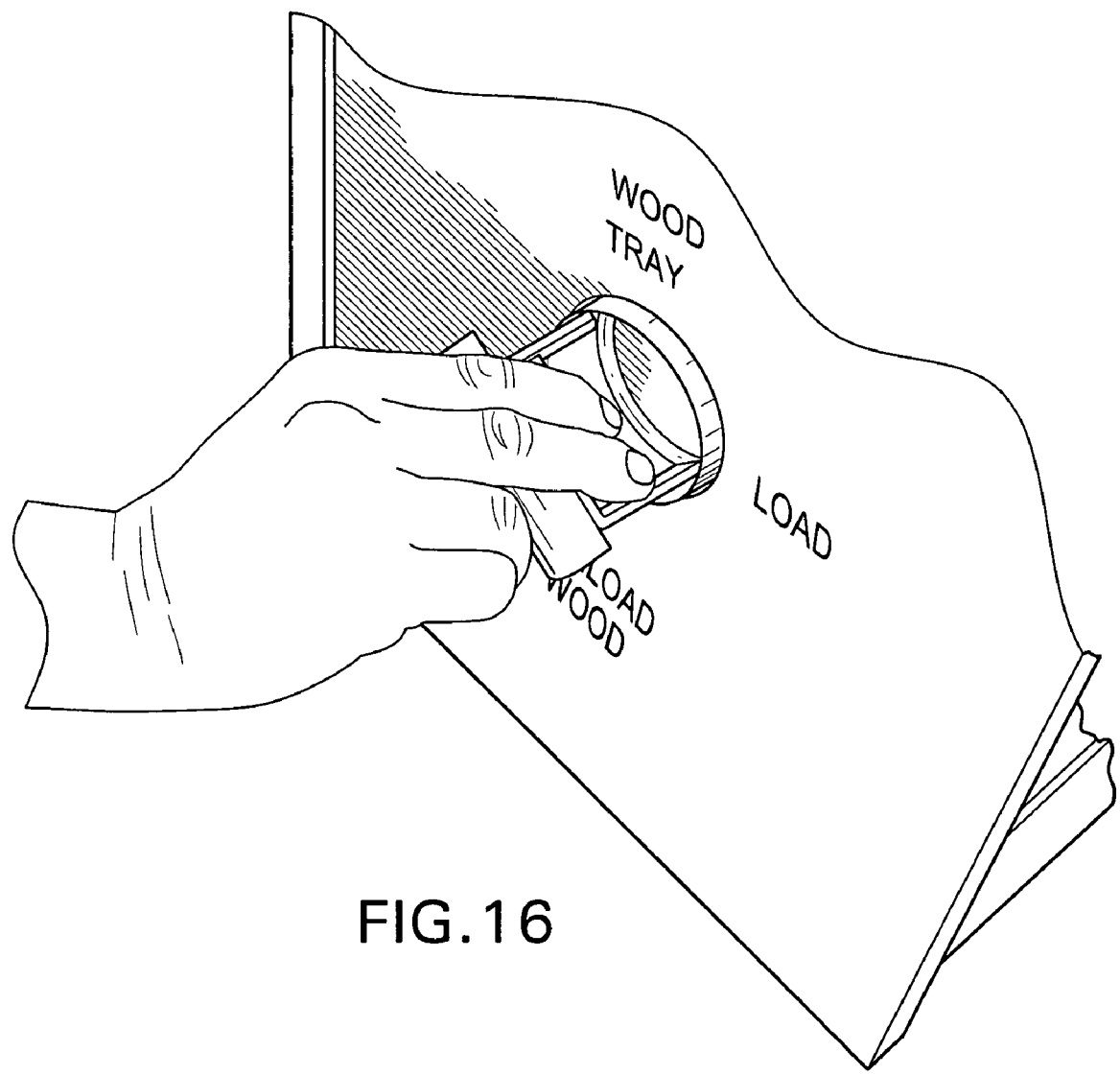
FIG. 16 shows the loader being dialed into a dump or "load" position relative to a smoker material reception tray.
Figure 17:
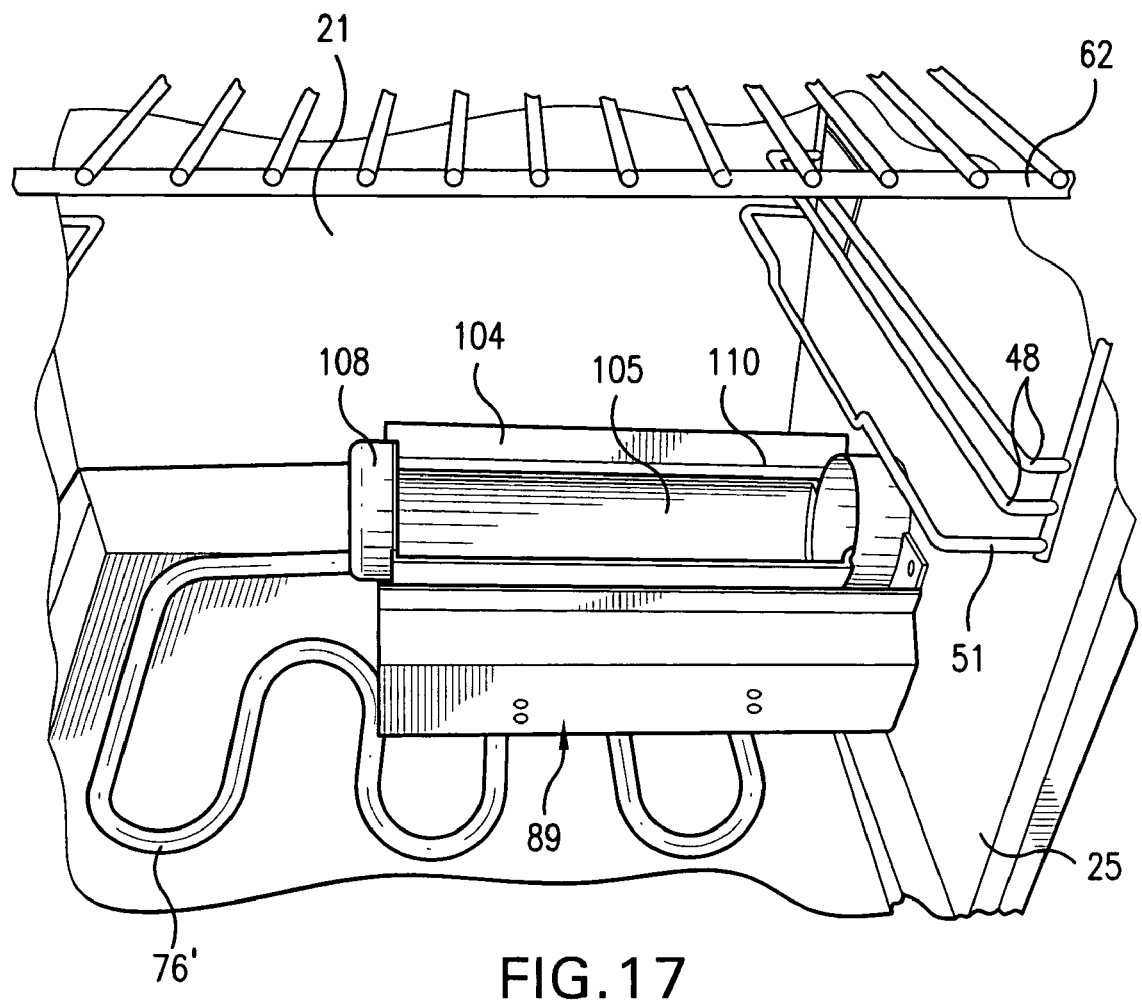
FIG. 17 shows the interior of the smoker housing with the loader in a non-dump, standby state (and with an alternate heater configuration)
Figure 18:
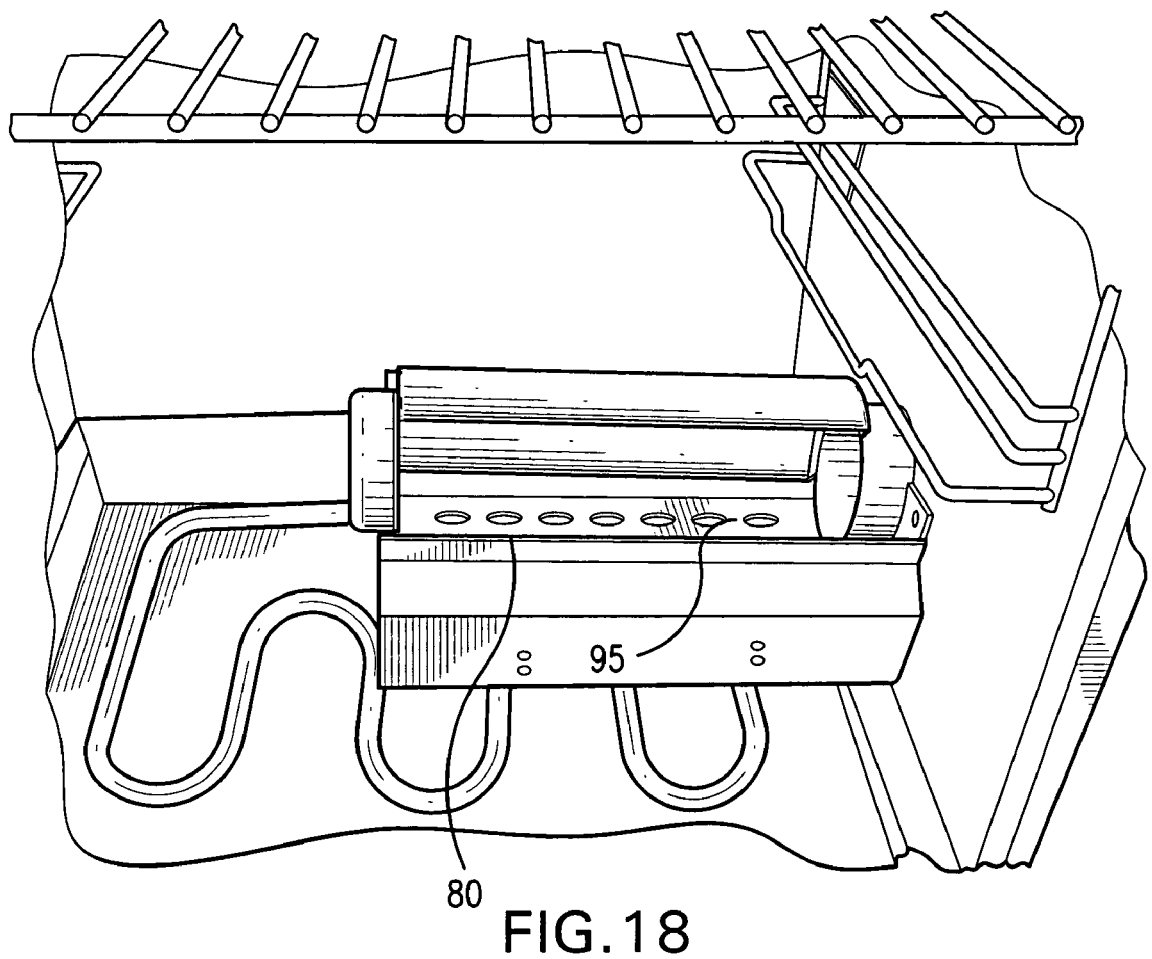
FIG. 18 shows a view similar to FIG. 17 with the loader being positioned between its no-dump and full dump states, relative to the smoker material reception tray there below.
Figure 19:
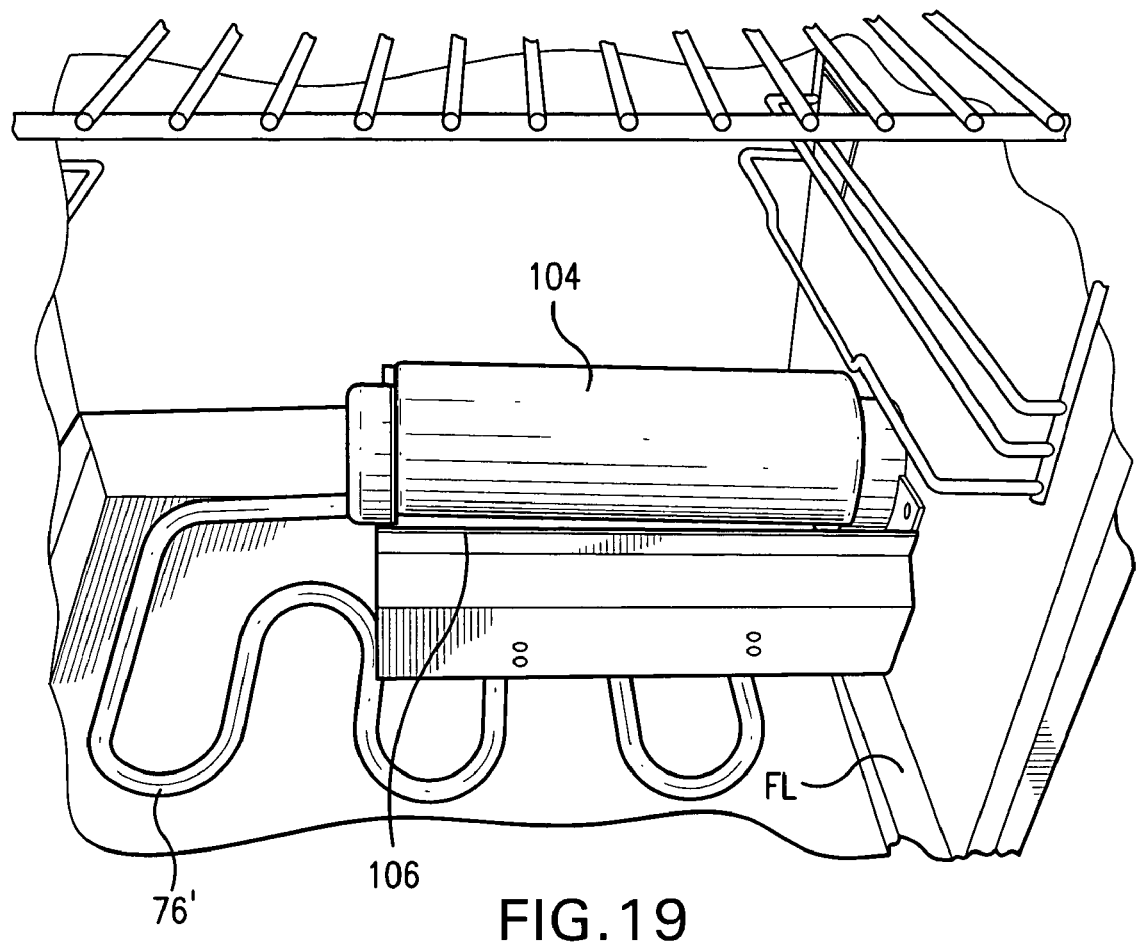
FIG. 19 shows the loader of FIG. 17 in its full dump state.

FIGS. 17 to 19 show an interior housing chamber 21 viewpoint of the adjustment of loader 105 with FIG. 17 corresponding to the exterior load (pre-dump) state of the loader in FIG. 15, and the interior view of FIG. 18 corresponding to the exterior view of FIG. 18 showing the rotation of loader 105 from its load position toward an unload or dump position. FIG. 19 shows an unload or dump state shown schematically in FIG. 11. FIG. 19 also illustrates the formerly bottom positioned vessel 106 of loader 105 having rotated to the top to act as a cover over the receiving tray 89 which facilitates a "closed box" heat and smoker material supply retention arrangement in the receiver tray and loader combination.

FIGS. 17 to 19 further illustrate a modified heater element 76' which includes additional coil loop sections extending beyond the peripheral confines of the receiver tray so as to extend over essentially all of the bottom wall of the housing chamber 21. The embodiment shown in FIG. 3 with the heat resistance bar being configured to be the same or less than the periphery of the apertured base plate 95 except for the lead in branch set extending in from the wall support is preferred (e.g., from the standpoint of a more efficient heat application through avoidance of extraneous heat production in the smoker).

In other words, by confining the hear resistance bar's loop extension to conform or be inward of the periphery of the receiver tray 89 there is facilitated a more direct hear approach, preferably with a direct contact heat conduction element in addition to the radiant and convection heat exchange used to sufficiently heat the smoker material SM to achieve the smoke generation.

FIG. 20 illustrates an alternate embodiment of the invention which is similar to that of FIG. 1 but features an alternate smoke generating hear source involving combustibles "C", as in charcoal, coal, etc. to generate sufficient hear relative to the receiver tray to generate smoke in smoker material in the tray. A suitable support tray or grill "T" is preferably provided and the heat source is preferably positioned directly adjacent the tray 89 to heat the tray and smoker contents sufficiently. Also, in an alternate embodiment (not shown) the combustible and smoke generating material can be placed in direct contact as in a common tray supporting both, with the smoke generating material preferably supplied on top of the combustible. For this embodiment, the loader can be used to initially position or to resupply either the smoke generating material or the combustible depending upon the relative combustion rate for the intended use.

It should be emphasized that the above-described embodiments of the present invention, particularly, any "preferred" embodiments, are merely possible examples of various possible implementations embodying the principles of the invention. In other words, many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A smoker, comprising:
   a housing having a heat-up region and a smoke generating material receiving area;
   a smoke generating material loader positionable between a non-release of supported smoke generating material first position state and a release of smoke generating material for reception in the smoke generating material receiving area of said housing second position state, and wherein the smoke generating material receiving area comprises a receiver tray having an apertured base and a confining side wall to retain smoke generating material received from said loader.

2. The smoker of claim 1 wherein said heat source is an electrical heat source that comprises a resistance bar and said receiver tray is in direct contact with said heat resistance bar.

3. The smoker of claim 1 wherein said loader and said receiver tray assume a nested arrangement when said loader is inserted into said housing.

4. The smoker of claim 3 wherein said loader has a main body with a smoker material reception recess that releases smoke generating material to said receiver tray when said loader is in said second position state and is adjustable to substantially seal off a smoker material reception opening in said receiver tray.

5. The smoker of claim 4 wherein said confining wall comprises shields that include constricting upper panel sections which define the reception opening and between which is positioned said loader which essentially seals off the reception opening.

6. The smoker of claim 3 further comprises a heat resistance bar having an inlet section featuring two generally parallel prong sections and a loop section defining an overall "L-shaped" heat resistance bar configuration and the receiving area of said housing comprises a receiver tray with an apertured base and an outer peripheral configuration with which said resistance bar generally conforms in dimension or extends within that outer peripheral configuration.

7. A smoker, comprising:
a housing having a heat reception region and a smoke generating material reception area;
a smoke generating material loader removably supported by said housing and configured to supply smoke generating material to said reception area upon rotation from a no-dump state to a dump state, and wherein said loader comprises a main body which is insertable and removable relative to an aperture formed in said housing and includes a loader main body having an upper opened smoker generating material reception recess and a smoke generating material support surface with the upper opened reception recess dumping smoke generating material via gravity upon rotation of said loader from a no-dump state to a dump state.

8. The smoker of claim 7 wherein said loader has an end cap for essentially sealing off the side wall aperture in said housing upon loader insertion into said housing, and said receiving area includes a receiver tray in a nested arrangement with the inserted loader.

* * * * *